(12) United States Patent
Ayres et al.

(10) Patent No.: US 12,158,581 B1
(45) Date of Patent: Dec. 3, 2024

(54) OPTICAL SYSTEMS WITH HOLOGRAPHIC ELEMENTS FOR PRODUCING UNIFORM IMAGES

(71) Applicant: Apple Inc., Cupertino, CA (US)

(72) Inventors: Mark R. Ayres, Boulder, CO (US); Adam C. Urness, Boulder, CO (US); Jaebum Chung, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 696 days.

(21) Appl. No.: 17/390,535

(22) Filed: Jul. 30, 2021

Related U.S. Application Data

(60) Provisional application No. 63/063,135, filed on Aug. 7, 2020.

(51) Int. Cl.
| | | |
|---|---|---|
| G02B 27/01 | (2006.01) |
| G02B 5/32 | (2006.01) |
| G03H 1/02 | (2006.01) |
| G03H 1/04 | (2006.01) |
| G03H 1/08 | (2006.01) |

(52) U.S. Cl.
CPC ........... *G02B 27/0172* (2013.01); *G02B 5/32* (2013.01); *G03H 1/0248* (2013.01); *G03H 1/0465* (2013.01); *G03H 1/0866* (2013.01); *G02B 2027/0174* (2013.01); *G02B 2027/0178* (2013.01); *G03H 2223/16* (2013.01)

(58) Field of Classification Search
None
See application file for complete search history.

(56) References Cited

U.S. PATENT DOCUMENTS

| 10,180,520 B2 | 1/2019 | Ayres et al. |
| 2020/0264378 A1* | 8/2020 | Grant ................... G02B 6/0016 |
| 2020/0264435 A1 | 8/2020 | Urness et al. |

OTHER PUBLICATIONS

K. Curtis, L. Dhar, W. L. Wilson, A. Hill, M. R. Ayres, "k-Space Formalism", Holographic Data Storage: From Theory to Practical Systems, 2010, pp. 26-31, John Wiley & Sons, Ltd.
H. Kogelnik, "Coupled Wave Theory for Thick Hologram Gratings," Bell System Technical Journal, May 23, 1969, pp. 2909-2947, vol. 48, American Telephone and Telegraph Company.

* cited by examiner

*Primary Examiner* — Jennifer D. Carruth
(74) *Attorney, Agent, or Firm* — Treyz Law Group, P.C.; Michael H. Lyons

(57) ABSTRACT

An electronic device may provide images to an eye box. The device may include first and second sets of holograms that sequentially diffract light along an optical path. Each hologram in the first set may have a respective grating vector oriented along a common axis. Each of the grating vectors may have a respective magnitude. The magnitudes may be non-uniformly spaced across the first set of volume holograms. Similarly, each hologram in the second set may have a respective additional grating vector oriented along an additional common axis. Each of the additional grating vectors may have a respective additional magnitude. The additional magnitudes may be non-uniformly spaced across the second set of holograms. This may serve to produce diffracted light within filaments of k-space that mitigate angular harmonic sight lines in angle space, thereby preventing formation of non-uniformities in the images at the eye box.

28 Claims, 12 Drawing Sheets

OPTICAL SYSTEMS WITH HOLOGRAPHIC ELEMENTS FOR PRODUCING UNIFORM IMAGES

This application claims the benefit of U.S. Provisional Patent Application No. 63/063,135, filed Aug. 7, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays. In some scenarios, the optical elements include diffractive elements that perform sequential diffractions on light prior to providing the light to the user's eyes.

It can be challenging to design devices such as these. If care is not taken, the components used in displaying content may be unsightly and bulky and may not exhibit desired levels of optical performance. For example, if care is not taken, performing sequential diffractions on light can introduce undesirable image artifacts or non-uniformities to the light by the time the light reaches the user's eyes.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may provide images to an eye box. The display may include a display module that produces image light, a first set of discrete volume holograms configured to diffract the image light to produce first diffracted light, and a second set of discrete volume holograms configured to diffract the image light to produce second diffracted light that is directed towards an eye box. Each volume hologram in the first set of volume holograms may have a respective grating vector oriented along a common axis. Each of the grating vectors may have a respective magnitude. The magnitudes of the grating vectors may be non-uniformly spaced across the first set of volume holograms.

Additionally or alternatively, each volume hologram in the second set of volume holograms may have a respective additional grating vector oriented along an additional common axis. Each of the additional grating vectors may have a respective additional magnitude. The additional magnitudes of the additional grating vectors may be non-uniformly spaced across the second set of volume holograms. The magnitudes and/or the additional magnitudes may, for example, be modulated by a modulation function such as a pseudorandom function, a linear function, a curve, a cyclic function, a step function, or other functions. In this way, adjacent frequency gaps may be non-uniform across the first and/or second sets of volume holograms.

If desired, a given one of the first and second sets of volume holograms may include a first region in which the set of volume holograms has first grating frequencies that are separated by first adjacent frequency gaps. The given one of the first and second sets of volume holograms may also include a second region in which the set of volume holograms has second grating frequencies that are separated by second adjacent frequency gaps that are different from the first adjacent frequency gaps. The densities of the set of volume holograms may vary between the first and second regions.

Modulating the magnitudes of the grating vectors in the first and/or second sets of volume holograms in this way may serve to produce second diffracted light within filaments of k-space that mitigate angular harmonic sight lines in angle space. This may prevent the formation of corn row artifacts or other non-uniformities in the image at the eye box.

DETAILED DESCRIPTION

Figure 1:
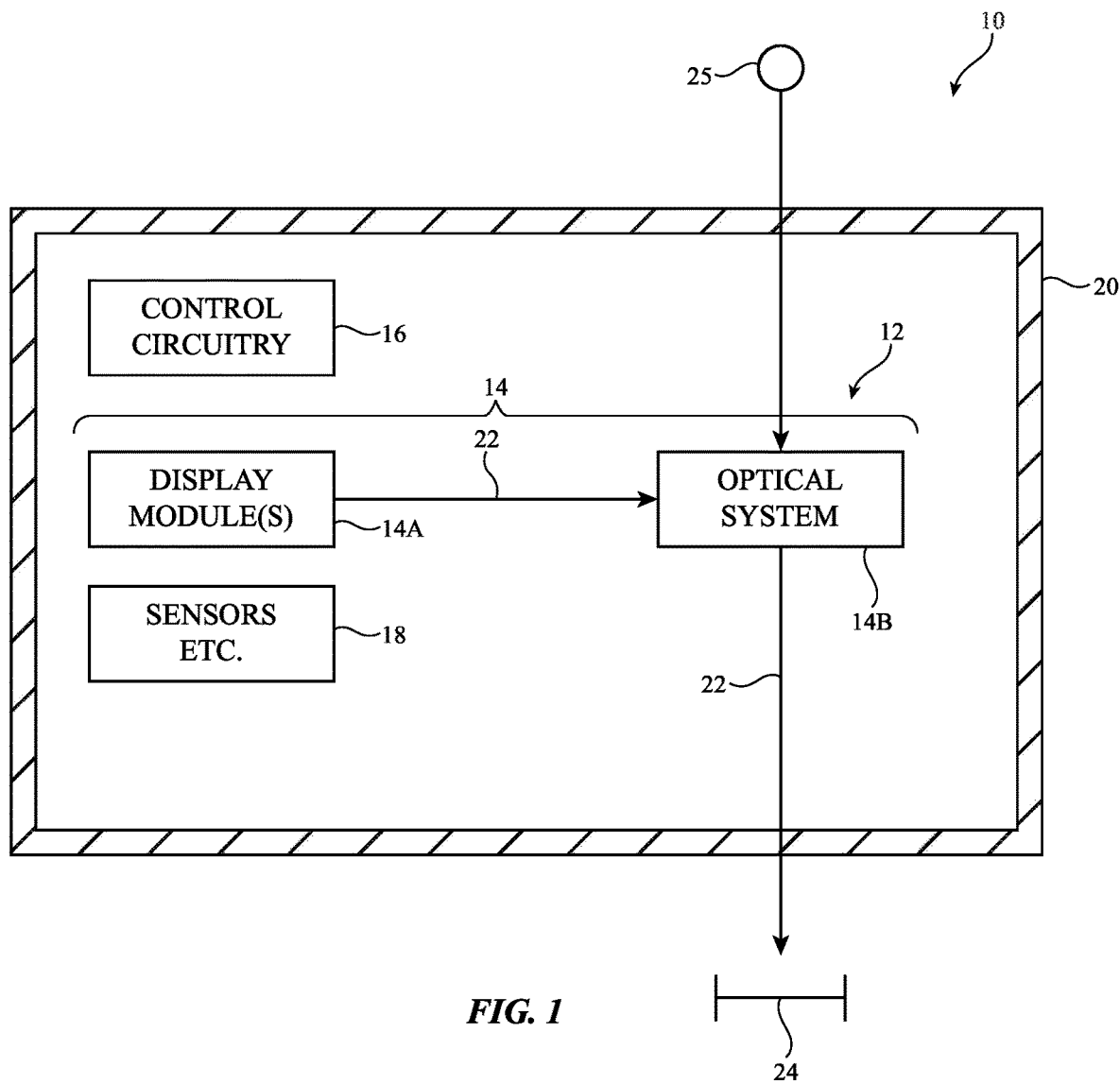
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, infrared-based gaze tracking sensors, light sensors, haptic output devices, speakers, batteries, wireless communications circuits for communicating between system 10 and external electronic equipment, etc.).

Display modules 14A (sometimes referred to herein as display engines 14A, light engines 14A, or projectors 14A) may include reflective displays (e.g., displays having arrays of light sources that produce illumination light that reflect off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
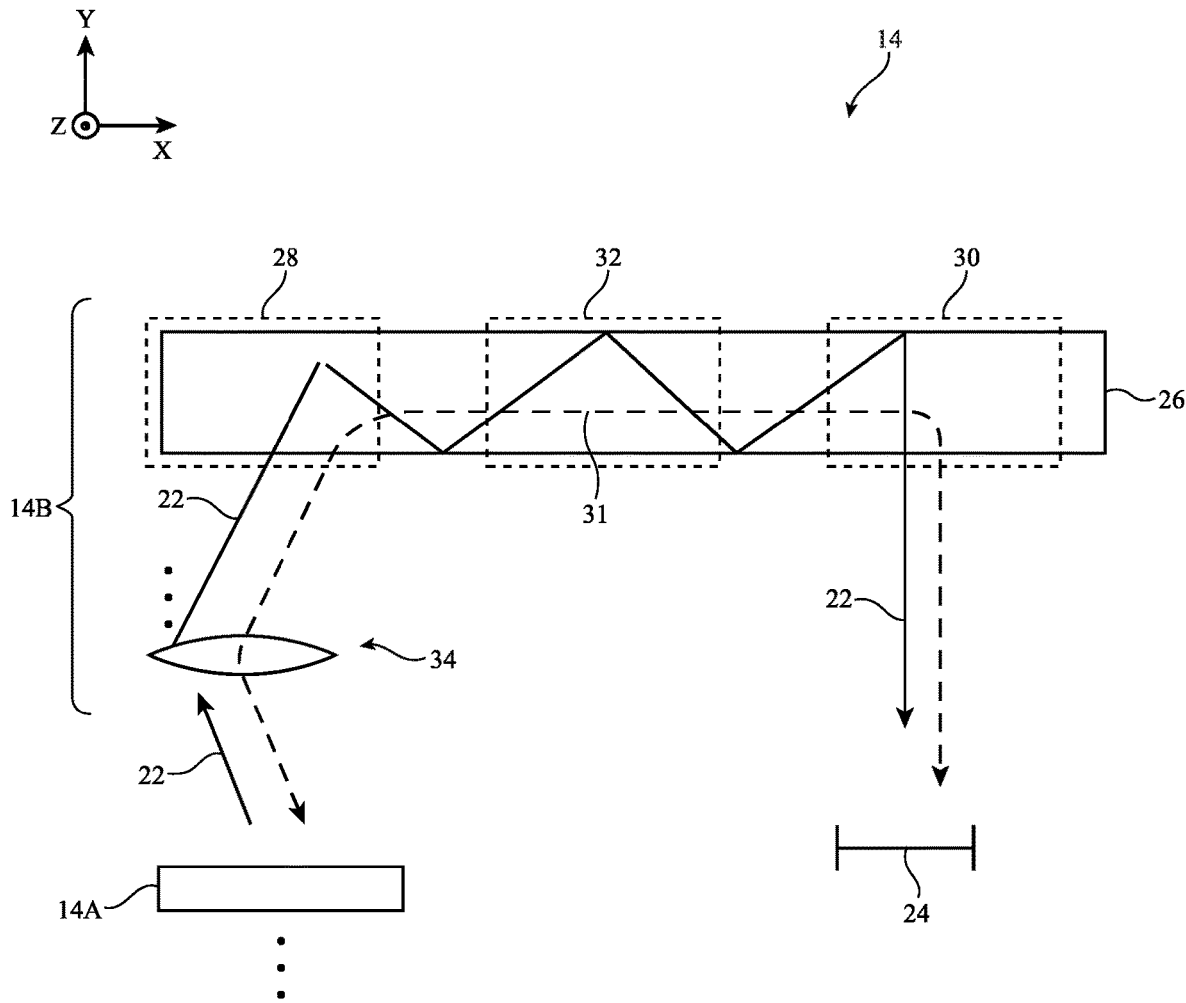
FIG. 2 is a top view of an illustrative optical system for a display having a waveguide with optical couplers in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). An example in which the diffractive gratings include volume holograms is sometimes described herein as an example.

Optical system 14B may include collimating optics such as collimating lens 34. Collimating lens 34 may include one or more lens elements that help direct image light 22 towards waveguide 26. Collimating lens 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module(s) 14A may generate image light 22 associated with image content to be displayed to eye box 24. Image light 22 may be collimated using a lens such as collimating lens 34. Optical system 14B may be used to present image light 22 output from display module(s) 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc. Display 14 may have multiple cross-couplers 32 if desired.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism and a steering mirror or liquid crystal steering element. As an example, display module(s) 14A may emit image light 22 in direction +Y towards optical system 14B. When image light 22 strikes input coupler 28, input coupler 28 may redirect image light 22 so that the light propagates within waveguide 26 via total internal reflection towards output coupler 30 (e.g., in direction X). When image light 22 strikes output coupler 30, output coupler 30 may redirect image light 22 out of waveguide 26 towards eye box 24 (e.g., back along the Y-axis). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 and cross-coupler 32 are formed from diffractive gratings embedded within and/or layered onto waveguide 26 (e.g., volume holograms recorded on one or more layers of grating media stacked between or on transparent polymer waveguide substrates), whereas input coupler 28 includes a prism mounted to an exterior surface of waveguide 26 (e.g., an exterior surface defined by a waveguide substrate that contacts the grating medium or the polymer layer used to form output coupler 30).

In other words, display 14 may provide image light 22 from display module 14A to eye box 24 along optical path 31. Lens 34, input coupler 28, cross-coupler 32, and output coupler 30 may be (optically) interposed on optical path 31 (e.g., where cross-coupler 32 is optically interposed on optical path 31 between input coupler 28 and output coupler 30, output coupler 30 is optically interposed on optical path 31 between cross-coupler 32 and eye box 24, etc.). In propagating along optical path 31, image light 22 may be diffracted multiple times. For example, cross-coupler 32 may perform a first diffraction on image light 22 and output coupler 30 may perform a second diffraction on the image light 22 that was diffracted by cross-coupler 32. The image light 22 diffracted by cross-coupler 32 and provided to output coupler 30 may sometimes be referred to herein as first diffracted light. The first diffracted light diffracted by output coupler 30 may sometimes be referred to herein as second diffracted light (e.g., the image light 22 provided to eye box 24 may be the second diffracted light). This example is merely illustrative and, in general, optical path 31 may include any desired optical components including any desired number of holographic optical elements arranged in any desired manner (e.g., while cross-coupler 32 and output coupler 30 are sometimes described herein as cascaded or sequential holographic optical elements that diffract image light 22, reference to cross-coupler 32 and output coupler 30 herein may be replaced with any holographic optical elements that perform sequential or cascaded diffractions on the same image light).

If care is not taken, subjecting image light 22 to sequential or cascaded diffractions by holographic optical elements that are discrete (e.g., cross-coupler 32 and output coupler 30) may lead to the creation of gaps in the spectral or angular response of each holographic optical element, which may result in non-uniformity of the image displayed at eye box 24. In some cases, the non-uniformity may manifest simply as a spatial intensity of color variation. It may therefore be desirable to be able to provide display 14 with the ability to provide uniform images at eye box 24, despite the presence of multiple discrete holographic optical elements along optical path 31.

Many dielectric mirrors are produced by coating a surface (typically glass) with layers of materials with differing electric permittivity arranged so that the Fresnel reflections from the layer boundaries reinforce constructively, producing a large net reflectivity. Broadband dielectric mirrors can be designed by ensuring that this condition is obtained over a large specified range of wavelengths and incidence angles. Because the layers must be deposited on a surface, the reflective axis must always be coincident with the surface normal in this scenario.

Holographic optical elements used in forming cross-coupler 32, output coupler 30, and/or any other desired optical components along optical path 31 of FIG. 2 may reflect light where the angle of incidence and the angle of reflection are defined with respect to a reflective axis other than a reflective axis on the surface normal of waveguide 26 (e.g., where the surface normal is oriented perpendicular to the lateral surface of waveguide 26 facing lens 34 and/or the lateral surface of waveguide 26 opposite lens 34). These holographic optical elements may sometimes be referred to herein as "skew mirrors." In some cases, skew mirrors may be fabricated holographically, and in some cases skew mirrors may comprise discrete holograms. Such discrete skew mirrors may be easier to manufacture and achieve higher net reflectivity than continuous skew mirrors, at the cost of leaving gaps in the spectral and angular responses. For imaging applications with a single skew mirror and a broadband source, the gaps may be imperceptible to a human viewer. However, for multiple skew mirrors configured in sequence (e.g., in scenarios where skew mirrors are used to form cross-coupler 32 and output coupler 30), sequentially-applied gaps may produce brightness and color non-uniformities, and/or dark image regions. In one common manifestation, non-uniformities appear as fine bright and dark lines sometimes referred to herein as corn row artifacts or simply as "corn rows."

Broadband holographic mirrors such as broadband skew mirrors can be created in a volumetric dielectric medium, such as a holographic recording medium (grating medium). The broadband mirror is formed by constraining the spatial dielectric modulation spectrum as described herein. The dielectric modulation may be accomplished by any means, but in one suitable arrangement the dielectric modulation is accomplished holographically by recording the interference pattern of two or more coherent light beams in a photosensitive holographic recording medium.

K-space formalism is a method for analyzing holographic recording and diffraction. In k-space (sometimes referred to as momentum space), propagating optical waves and holographic gratings are represented by three dimensional Fourier transforms of their distributions in real space. For example, an infinite collimated monochromatic reference beam can be represented in real space using equation 1 and in k-space using equation 2.

$$E_r(\vec{r}) = A_r \exp(i\vec{k}_r \cdot \vec{r}) \quad (1)$$

$$E_r(\vec{k}) = A_r \delta(\vec{k} - \vec{k}_r) \quad (2)$$

In equation 1, "exp( )" is the exponential operator, "·" is the dot product operator, and $E_r(\vec{r})$ is the optical scalar field distribution of the beam at all $\vec{r} = \{x, y, z\}$ three-dimensional spatial vector locations. In equation 2, $E_r(\vec{k})$ is the Fourier transform of $E_r(\vec{r})$ in equation 1, where $E_r(\vec{k})$ is the optical scalar field distribution of the beam at all $k = \{k_x, k_y, k_z\}$ three-dimensional spatial frequency vectors. In equations 1 and 2, $A_r$ is the scalar complex amplitude of the field and $\vec{k}_r$ is the wave vector, where the length of wave vector $\vec{k}_r$ indicates the spatial frequency (e.g., wavelength) of the light waves in the beam and the direction of wave vector $\vec{k}_r$ indicates the direction of propagation of the light waves in the beam. In some scenarios, all beams are composed of light of the same wavelength, so all optical wave vectors must have the same length $|\vec{k}_r| = k_n$, where "||" is the absolute value operator. Thus, all optical propagation vectors lie on a sphere of radius $k_n = 2\pi n_0/\lambda$, where $n_0$ is the average refractive index of the hologram (sometimes referred to herein as the "bulk index"), where $\lambda$ is the vacuum wavelength of the light, and where "/" is the division operator. This construct is referred to as the k-sphere. In other scenarios, light of multiple wavelengths may be decomposed into a superposition of wave vectors of differing lengths, lying on different k-spheres.

Another notable k-space distribution is that of the holograms themselves. Volume holograms are usually formed from spatial variations of the index of refraction within the recording medium, denoted as $\Delta n(\vec{r})$. Ideally, this index modulation pattern is proportional to the spatial intensity of the recording interference pattern, as given by equation 3.

$$\Delta n(\vec{r}) \propto |E_S(\vec{r}) + E_r(\vec{r})|^2 = |E_S(\vec{r})|^2 + |E_r(\vec{r})|^2 + E_S^*(\vec{r})E_r(\vec{r}) + E_S(\vec{r})E_r^*(\vec{r}) \quad (3)$$

In equation 3, $E_S(\vec{r})$ is the spatial distribution of the signal beam field, the superscript "*" denotes a complex conjugate, and the final term $E_S(\vec{r})E_r^*(\vec{r})$ maps the incident reference beam into the reflected signal beam. Applying a Fourier transform to this term gives equation 4.

$$E_r(\vec{k}) \otimes E_S(\vec{k}) \quad (4)$$

In equation 4, "⊗" is the three-dimensional cross-correlation operator. In other words, the product of one optical field and the complex conjugate of another in the spatial domain becomes a cross correlation of their respective Fourier transforms in the frequency domain.

Consider an example of a simple Bragg reflection hologram written with counter-propagating beams (e.g., signal and reference beams incident on the recording medium 180 degrees apart). The beams form planar interference fringes, which are recorded as a sinusoidal refractive index modulation within the recording layer. In the counter-propagating configuration, the recorded fringes have a spacing exactly half that of the (internal) wavelength of the light used to record the hologram. In k-space, the recording beams $E_r(\vec{k})$ and $E_S(\vec{k})$ are represented by point-like distributions lying on opposite sides of the k-sphere. The wave vectors for the beams, $\vec{k}_r$ for the reference beam and $\vec{k}_S$ for the signal beam, extend in opposing directions from the origin of the k-sphere (e.g., to the recording beam distributions). The hologram itself is also represented by two point-like distributions $\Delta n(\vec{k})$ (e.g., lying at opposing sides of an axis that runs through wave vectors $\vec{k}_r$ and $\vec{k}_S$). The location of the two $\Delta n(\vec{k})$ sidebands may be determined mathematically from the cross-correlation operations $E_r(\vec{k}) \otimes E_S(\vec{k})$ and $E_S(\vec{k}) \otimes E_r(\vec{k})$, respectively, or geometrically from the vector differences $\vec{K}_{G+}=\vec{k}_S-\vec{k}_r$ and $\vec{K}_{G-}=\vec{k}_r-\vec{k}_S$, where $\vec{K}_{G+}$ and $\vec{K}_{G-}$ are the grating vectors from the respective sidebands to the origin. Note that as a matter of convention, wave vectors are represented by a lowercase letter "k" whereas hologram grating vectors are represented by an uppercase letter "K."

Once recorded, the hologram may be illuminated by a probe beam to produce diffraction. The diffraction process can be represented by a set of mathematical and geometric operations in k-space similar to those of the recording process. In the weak diffraction limit, the diffracted light distribution is given by equation 5.

$$E_d(\vec{k}) \propto \Delta n(\vec{k}) * E_p(\vec{k})|_{|\vec{k}|=k_n} \quad (5)$$

In equation 5, $E_d(\vec{k})$ is the k-space distribution of the diffracted beam, $E_p(\vec{k})$ is the k-space distribution of the probe beam, "*" is the three-dimensional convolution operator, and the notation $|_{|\vec{k}|=k_n}$ indicates that the preceding expression in equation 5 is evaluated only where $|\vec{k}|=k_n$, which is where the result lies on the k-sphere.

When the probe beam resembles the reference beam used for recording, the effect of the convolution is to reverse the cross correlation during recording, and the diffracted beam will substantially resemble the recorded signal beam. When the probe beam has a different k-space distribution, the hologram may produce an altogether different diffracted beam. Note also that while the recording beams must be mutually coherent, the probe beam and the diffracted beam are not so constrained. A broadband probe beam may be analyzed as a superposition of single-wavelength beams, each obeying equation 5 with a different k-sphere radius.

Consider another example in which the simple Bragg reflection hologram written with counter-propagating beams is illuminated with a probe beam having a shorter wavelength than the light used for recording the hologram. The shorter wavelength corresponds to a longer wave vector, and hence a probe k-sphere of greater radius than that of the recording k-sphere. In a first case, the angle of the probe beam may be adjusted so that the convolution of equation 5 produces a point-like distribution of $E_d(\vec{k})$ that lies on the probe k-sphere. In this case, the probe beam is said to be "Bragg-matched" to the hologram, and the hologram may produce significant diffraction. The convolution operation may also be represented by the vector sum $\vec{k}_d=\vec{k}_p+\vec{K}_{G+}$, where $\vec{k}_d$ is the wave vector of the diffracted beam and $\vec{k}_p$ is the wave vector of the probe beam. In the first case, the hologram performs a mirror-like diffraction of the probe beam, where the probe beam angle of incidence with respect to the $k_z$ axis is equal to the diffracted beam angle of reflection. In a second case, the hologram may be Bragg-mismatched, where the point-like distribution of $\Delta n(\vec{k})*E_p(\vec{k})$ does not lie on the probe beam k-sphere, and thus no significant diffraction occurs.

Comparing the first and second cases, it is evident that the hologram will only produce mirror-like diffraction over a very small range of input (incident) angles for a given probe wavelength, if at all. If desired, this range may be somewhat extended by over-modulating the hologram, or by using a very thin recording layer. However, these steps may still not lead to mirror-like behavior over a large range of wavelengths and angles. These steps may also lead to undesired chromatic dispersion. In these examples, the hologram is a reflection hologram constituted by a single sinusoidal grating in the recording medium. The hologram will exhibit mirror-like reflectivity in a relatively narrow band of wavelengths and incident angles. Broadband and wide-angle operations may be achieved by creating a more complex structure that includes multiple gratings. Methods for achieving broadband and wide-angle operation holographically are now described.

Consider an example in which light of multiple wavelengths (e.g., red, green, and blue light) is diffracted by the holographic optical element. In this example, an index modulation $\Delta n(\vec{k})$ for a hologram that produces broadband mirror-like diffraction may be extended to produce two line segment-like distributions in k-space (rather than two point-like distributions as described above). The line segment-like distributions are situated symmetrically about the origin and thus may be realized as conjugate sidebands of a real-valued refractive index $\Delta n(\vec{r})$ in real space. In some scenarios, the modulation may include absorptive and/or emissive components, and thus may not exhibit conjugate symmetry in k-space. The complex amplitude of the distribution may be uniform or may vary in amplitude and/or phase while still exhibiting substantially broadband mirror-like diffraction. In one suitable arrangement, the line segment-like distributions are situated substantially along the $k_z$ axis which, as a matter of convention, is the thickness direction of the recording medium layer.

Illumination of the hologram by a collimated probe beam with a point-like k-space distribution $E_p(\vec{k})$ results in a convolution distribution $\Delta n(\vec{k})*E_p(\vec{k})$ according to equation 5. Because $E_p(\vec{k})$ is point-like, this convolution operation resembles a simple translation of $\Delta n(\vec{k})$ from the origin to the tip of the wave vector $\vec{k}_p$ of the probe beam. Then, also according to equation 5, only the part of $\Delta n(\vec{k})*E_p(\vec{k})$ intersecting the k-sphere of $E_p(\vec{k})$ contributes to diffraction. This produces another point-like distribution, $E_d(\vec{k})$, constituting the diffracted beam. Because $\Delta n(\vec{k})$ resembles a line segment parallel to the $k_z$ axis, it is evident that the angle of reflection, $\theta_r$, is substantially equal to the angle of incidence, $\theta_i$, so that the hologram exhibits mirror-like behavior. Furthermore, it is also evident that this property holds for any incidence angle and wavelength that produces any diffraction at all, and for any superposition of probe beams producing diffraction. The distribution of $\Delta n(\vec{k})*E_p(\vec{k})$ will always intersect the probe k-sphere at a single point with mirror-symmetry about the $k_x$ axis (or about the $k_x$, $k_y$ plane in the three-dimensional case). Thus, the hologram will exhibit mirror-like behavior at a broad range of wavelengths and angles, and thus constitutes a broadband holographic mirror. There need not be a gap in $\Delta n(\vec{k})$ near the origin in this example, but it may be difficult in practice to create holographic gratings with very low spatial frequencies. The presence of such a gap may only limit performance at very high $\Delta\theta$ (the grazing angles of both incidence and reflection), which is a condition best avoided in many other types of mirrors.

In another suitable arrangement, the broadband mirror spectrum described above may be rotated to an arbitrary angle with respect to the $k_x$, $k_y$, $k_z$ axes in k-space. The hologram may form a skew mirror in scenarios where the $\Delta n(\vec{k})$ distribution is not perpendicular to the relevant reflecting surface in real space, for example. Consider one example in which the distributions and vectors described above have been rotated by approximately 45 degrees about the origin. This may also produce mirror-like diffraction for all probe beam wavelengths and angles that produce diffraction. The diffraction is mirror-like with respect to the reflective axis defined by the line segment-like $\Delta n(\vec{k})$ distribution (i.e., the angle of incidence is substantially equal to the angle of reflection with respect to this axis). In the case of a discrete skew mirror, the continuous line segment-like $\Delta n(\vec{k})$ distribution contains gaps. If the locus of diffraction where the $\Delta n(\vec{k})*E_p(\vec{k})$ distribution intersects the incident k-sphere falls in a gap, the diffracted amplitude will fall to zero.

Figure 3:
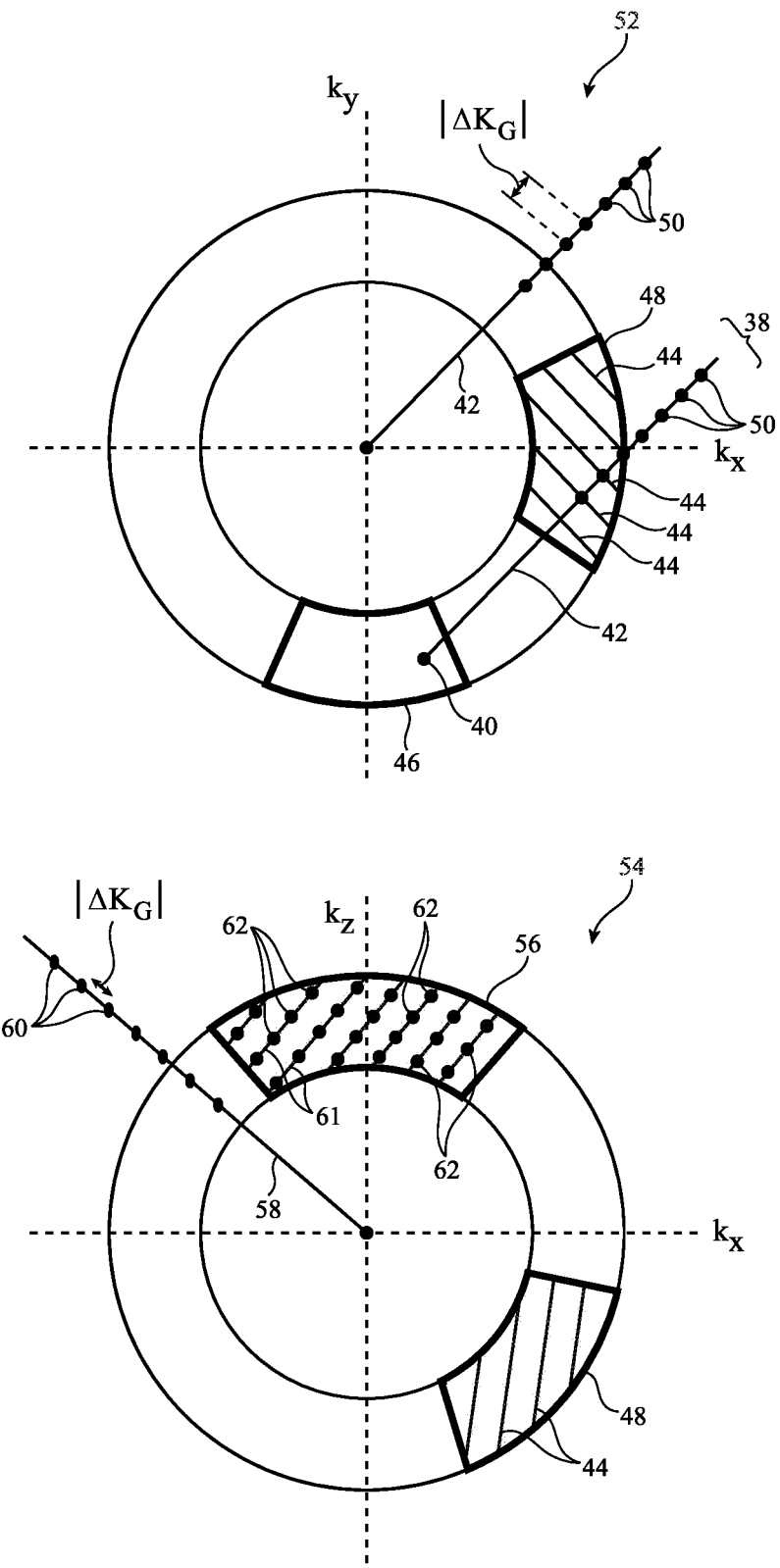
FIG. 3 is a two-dimensional cross section of three-dimensional k-space showing how illustrative first and second sets of holograms that are interposed in sequence on an optical path may produce diffracted light within corresponding k-space filaments in accordance with some embodiments.

FIG. 3 illustrates a configuration employing a first skew mirror (e.g., a holographic optical element such as a diffractive grating structure having one or more gratings (e.g., volume holograms) where the $\Delta n(\vec{k})$ distributions of the gratings are not perpendicular to the relevant reflecting surface in real space) that performs a first diffraction on incident light to produce first diffracted light, and employing a second skew mirror that performs a second diffraction on the first diffracted light to produce second diffracted light. As an example, first skew mirror may be used to form cross-coupler 32 and the second skew mirror may be used to form output coupler 30 of FIG. 2. In this example, the incident light may be image light 22 of FIG. 2, cross-coupler 32 may diffract the image light to produce the first diffracted light, and output coupler 30 may diffract the first diffracted light to produce second diffracted light that is coupled out of waveguide 26 and towards eye box 24.

As shown in FIG. 3, plot 52 illustrates the effect of the gaps in the first discrete skew mirror (e.g., in cross-coupler 32) on a band of angles and wavelengths in a cross-section of k-space. More particularly, plot 52 shows a cross-section of k-space in the k-$k_y$ plane (e.g., where the distance from the origin corresponds to different wavelengths). Region 46 of plot 52 corresponds to the input light distribution for light incident upon the first skew mirror (e.g., where the incident light is image light 22 incident upon cross-coupler 32 of FIG. 2). As shown by region 46, the incident light includes a range of different wavelengths and incidence angles (e.g., because the first skew mirror is a broadband skew mirror).

The first skew mirror may include diffractive grating structures such as a first set of diffractive gratings (e.g., volume holograms). Each hologram in the first set has a corresponding grating frequency $K_G$, as shown by points 50 (sometimes referred to herein as grating frequencies 50). Each hologram in the first set may, for example, lie within the same physical (spatial) volume of grating medium (e.g., each hologram may overlap and be superimposed with the other holograms in the first set). The grating vectors for each hologram in the first set may be oriented in the same direction (e.g., along axis 42). Each grating frequency 50 corresponds to the length (magnitude) of the grating vector for a respective hologram in the first set. In this way, each of the holograms in the first set may exhibit a substantially constant (uniform) reflective axis for reflecting light in a desired direction (e.g., towards output coupler 30 of FIG. 2).

The holograms in the first skew mirror may diffract the incident light associated with region 46. This is illustrated geometrically by performing a vector addition of the grating vectors of the holograms in the first set with the wave vectors of the incident light associated with region 46. This operation is illustrated in portion 38 of plot 52 for incident light at point 40 within region 46. Diffraction of this incident light by the first set of holograms may produce first diffracted light associated with the location of the grating frequencies 50 that lie within region 48 after the vector addition (e.g., after adding the corresponding grating vectors to the wave vector of the incident light associated with point 40 in region 46). Each grating frequency 50 in the first skew mirror is separated from one or two adjacent grating frequencies 50 in the first set of holograms by a respective non-zero adjacent frequency gap (spacing) $|\Delta K_G|$ (e.g., there may be no holograms in the first set that lie within the frequency gaps). Repeating the vector addition across region 46 (e.g., to show the first diffraction performed by the first skew mirror for all of the incident light associated with region 46) produces (paints) stripes 44 within region 48.

Stripes 44 illustrate the reflected distribution of the first diffracted light in k-space, as produced by the first set of holograms (e.g., the first skew mirror) in diffracting the incident light associated with region 46. As shown in region 48, stripes 44 are separated by parallel gaps arising from the gaps in the discrete skew mirror (e.g., the adjacent frequency gaps between the grating frequencies 50 of the first set of holograms). In three-dimensional k-space, the distribution resembles a series of parallel plane-like distributions separated by gaps, or a "louvered" distribution. Stripes 44 may therefore sometimes be referred to herein as louvers 44 or light distribution louvers 44. If, for example, a skew mirror is recorded with a hologram spacing (e.g., between adjacent holograms in the corresponding set of holograms in the skew mirror) that is equal to three times the peak-to-null spacing of the selectivity function determined by the hologram thickness, then the approximate thickness of each louver would be one unit, and the approximate thickness of the gaps between louvers would be two units. The verb to "louver" may sometimes be used herein to describe the act of producing light distribution louvers such as louvers 44 by diffracting incident light using a set of volume holograms in a discrete skew mirror, for example.

Plot 54 of FIG. 3 illustrates the effect of the gaps in the second discrete skew mirror (e.g., in output coupler 30 of FIG. 2) on the first diffracted light produced by the first discrete skew mirror (e.g., in cross-coupler 32 of FIG. 2). The already-louvered light incident upon the second skew mirror is the first diffracted light produced by the first skew mirror. This light is represented by louvers 44 in region 48 of plot 54. Note that, since plot 54 shows a cross-section of k-space in the $k_x$-$k_z$ plane rather than the $k_x$-$k_y$ plane of plot 52, region 48 is shown from a different angle in plot 54 than in plot 52. There is only light incident upon the second skew mirror from louvers 44 within region 48 (e.g., because there is no first diffracted light from the first skew mirror within the gaps between louvers 44).

The second skew mirror may include diffractive grating structures such as a second set of diffractive gratings (e.g., volume holograms). Each hologram in the second set has a corresponding grating frequency $K_G$, as shown by points 60 (sometimes referred to herein as grating frequencies 60). Each hologram in the second set may, for example, lie within the same physical (spatial) volume of grating medium (e.g., each hologram may overlap and be superimposed with the other holograms in the second set). The grating vectors for each hologram in the second set may be oriented in the same direction (e.g., along axis 58 which is non-parallel with respect to axis 42 of plot 52). Each grating frequency 60 corresponds to the length (magnitude) of the grating vector for a respective hologram in the second set. In this way, each of the holograms in the second set may exhibit a substantially constant (uniform) reflective axis for reflecting light in a desired direction (e.g., towards eye box 24 of FIG. 2). In addition, each grating frequency 60 is separated from one or two adjacent grating frequencies in the second set of holograms by a corresponding adjacent frequency gap $|\Delta K_G|$.

The holograms in the second skew mirror may diffract the incident light associated with louvers 44 in region 48. This is illustrated geometrically by performing a vector addition of the grating vectors of the holograms in the second set with the wave vectors of the incident light associated with louvers 44 of region 48. In scenarios where light is incident upon the second set of holograms across the entirety of region 48, the presence of gaps between adjacent grating frequencies in the second set of holograms would also cause the second set of holograms to "paint" diffracted light within stripes (louvers) 61 of region 56. However, since light is incident upon the second set of holograms only within louvers 44 of region 48, the vector addition of the grating vectors associated with grating frequencies 60 with the wave vectors associated with louvers 44 in region 48 cause the second set of holograms to produce second diffracted light only at points 62 within region 56 (e.g., where points 62 lie along louvers 61 within region 56). In other words, because the light distribution is "re-louvered" by the second set of holograms in the second skew mirror, the remaining light distribution in region 56 after the second diffraction resembles the intersection of one set of parallel planes with another at an oblique angle, leaving a set of points 62 in the two-dimensional cross section of FIG. 3, which also correspond to line segment-like filaments in three-dimensional k-space.

Figure 4:
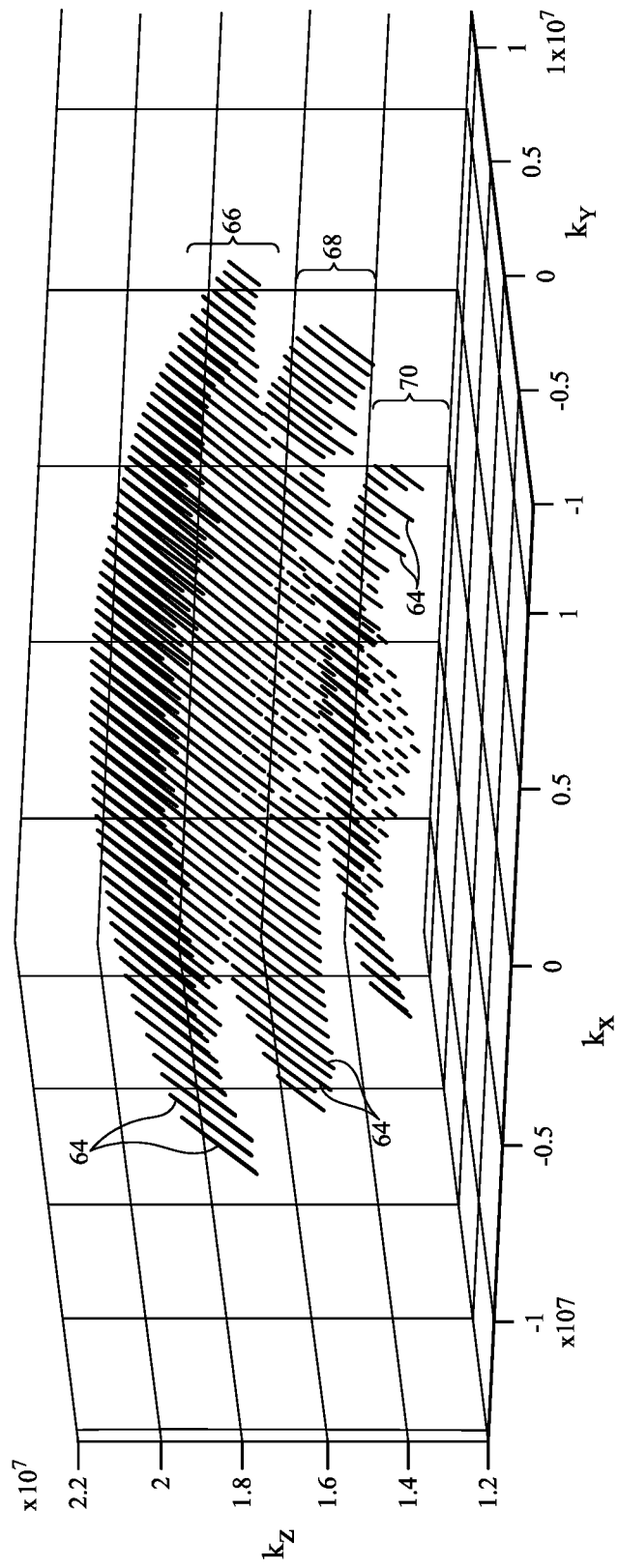
FIG. 4 is a three-dimensional plot of illustrative k-space filaments of the type shown in FIG. 3, within three different color bands, in accordance with some embodiments.

FIG. 4 is a diagram showing these filaments produced by the second skew mirror in three-dimensional k-space. As shown in FIG. 4, the second skew mirror (e.g., the second set of holograms in diffracting light produced by the first set of holograms) may produce line-segment like filaments 64 in three-dimensional k-space (sometimes referred to herein as k-space filaments 64). Each k-space filament 64 may, for example, correspond to a respective point 62 in the two-dimensional cross section of plot 54 of FIG. 3 (e.g., points 62 of FIG. 3 may be two-dimensional cross sections of respective filaments 64 of FIG. 4). In the example of FIG. 4, k-space filaments 64 include a first set of filaments 66, a second set of filaments 68, and a third set of filaments 70. The first set of filaments 66 may correspond to light of a first color band (e.g., light in a blue color band), the second set of filaments 68 may correspond to light of a second color band (e.g., light in a green color band), and the third set of filaments 70 may correspond to light of a third color band (e.g., light in a red color band), for example.

Filaments 64 are parallel to each other in k-space. Each filament 64 may represent a twice diffracted path employing one hologram from the first set of holograms in the first skew mirror (e.g., in cross-coupler 32 of FIG. 2) and another hologram from the second set of holograms in the second skew mirror (e.g., in output coupler 30 of FIG. 2). In other words, each filament 64 corresponds to the second diffracted light produced by a respective hologram in the second set of holograms after diffracting the first diffracted light produced by a respective hologram in the first set of holograms (which was in turn produced in response to image light 22 incident upon the first set of holograms within region 46 of FIG. 3).

The width of each filament 64 is determined by the selectivity functions of both the hologram from the first set of holograms and the hologram from the second set of holograms that produced that filament 64 (e.g., evaluated at the k-space location of each diffraction). Generally, the holograms are recorded in a thick medium in order to support a high image resolution. This means the selectivity function of the holograms, and hence the width of the filaments, is very thin (e.g., on the order of one resolvable spot).

The example of FIG. 4 is merely illustrative. In general, image light 22 may include light in any desired number of color bands (e.g., filaments 64 may correspond to any desired number of color bands). The example of FIG. 4 corresponds to a cross-coupler having 26 holograms in the first set and an output coupler having 21 holograms in the second set. This is merely illustrative and, in general, the first skew mirror (e.g., the first set of holograms or cross-coupler 32) and the second skew mirror (e.g., the second set of holograms or output coupler 30) may include any desired number of holograms.

Figure 5:
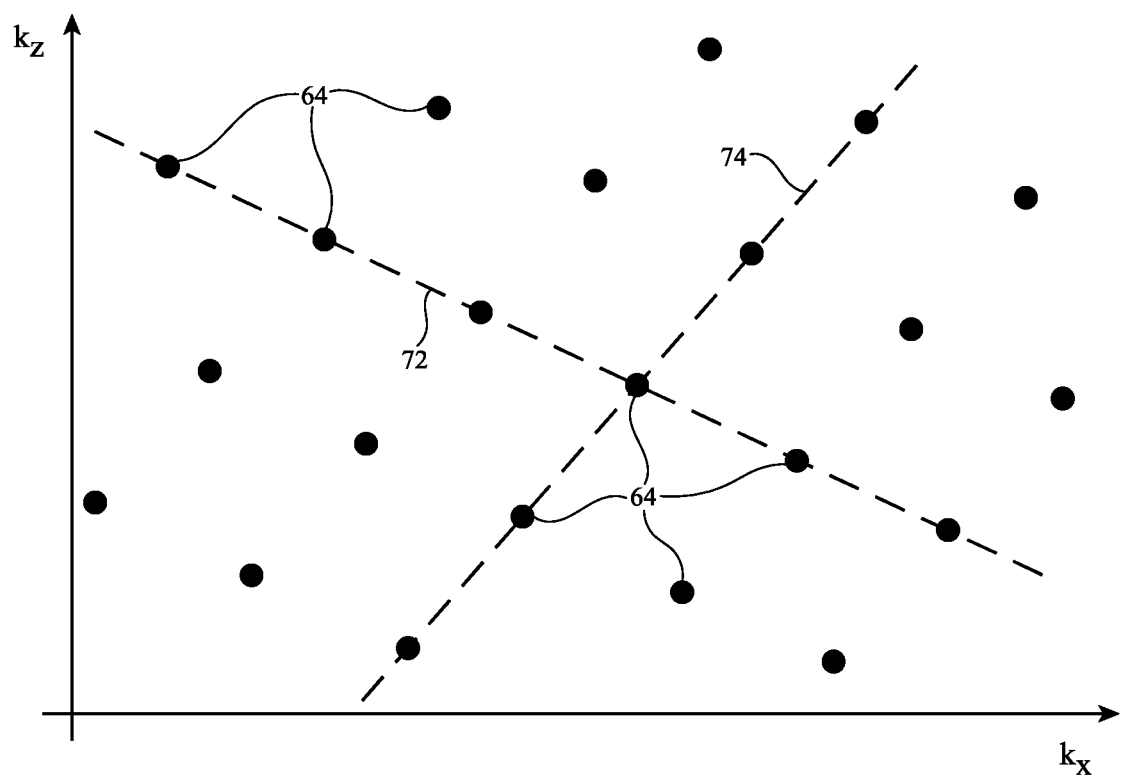
FIGS. 5 and 6 are two-dimensional cross sections of three-dimensional k-space showing how illustrative k-space filaments of the type shown in FIGS. 3 and 4 may have associated angular harmonic sight lines that produce corn rows or other non-uniformities in images provided to an eye box in accordance with some embodiments.

FIG. 5 is a cross-sectional view (in the $k_y=0$ plane) of the filaments 64 in the third set of filaments 70 of FIG. 4 (e.g., filaments 64 in the red color band). Similar cross-sectional views may also be produced of the filaments 64 in the second set of filaments 68 and the first set of filaments 66 of FIG. 4. As shown in FIG. 5, each filament 64 is represented by a single dot in the $k_x$-$k_z$ plane (e.g., where $k_y=0$). The dot corresponding to each filament 64 may sometimes be referred to herein as a "corn stalk," whereas the set of all dots may sometimes be referred to herein as a "corn field." In other words, each corn stalk may be the diffracted locus on the combination of one respective hologram from the first set of holograms (e.g., from cross-coupler 32) with one respective hologram from the second set of holograms (e.g., from output coupler 30).

The corn stalks are arranged in oblique rows 72 and oblique columns 74. Each corn stalk along a given row 72 corresponds to light diffracted by a common hologram in the first set of holograms and by a different respective hologram from the second set of holograms. Similarly, each corn stalk along a given column 74 corresponds to light diffracted by a common hologram in the second set of holograms and by a different respective hologram in the first set of holograms. The angle of each corn stalk as viewed from the origin (e.g., in three-dimensional space) determines where in the field of view the diffracted locus of the corn stalk appears. Thus, the available angles for diffraction are determined by those subtended by at least one corn stalk. If the corn field is sparse, there may be angular regions not covered by any corn stalks, which would appear by analogy as a gap where an observer situated at the origin can see through to the other side of the corn field. In two dimensions, the angular patterns of filaments (sometimes referred to herein as the "canvas" on which images are projected) must cover all angles within the field of view with all three color bands. Gaps in the canvas will correspond to regions where no image light can be projected and/or to color non-uniformity in the projected image as received at eye box 24 of FIG. 2.

Figure 6:
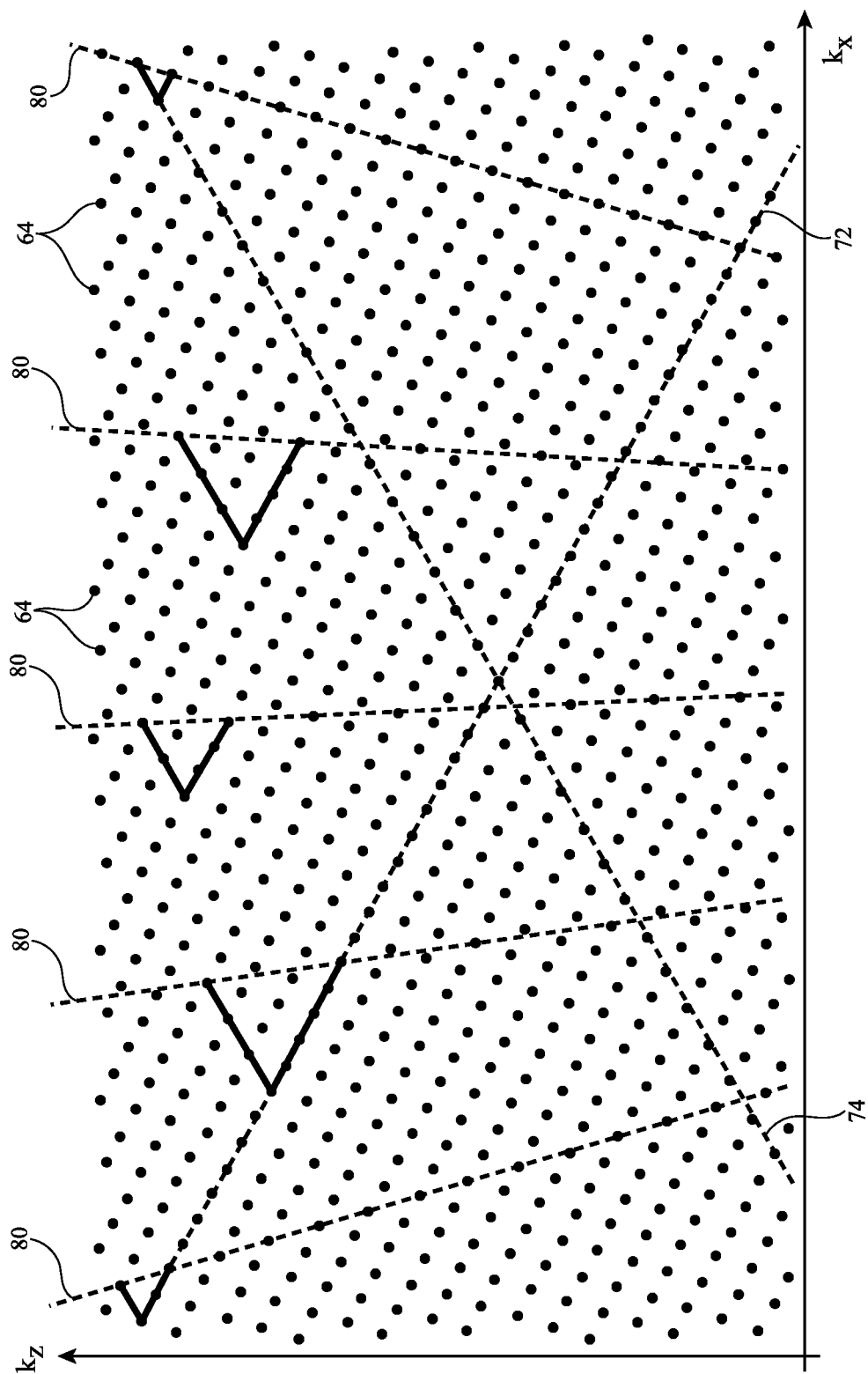

The regular spacing of filaments 64 and thus the corn stalks of FIG. 5 may produce large variations in the angular coverage of the corn field or canvas as projected at eye box 24 of FIG. 2. FIG. 6 is a cross-sectional view of filaments 64 (e.g., a corn field of corn stalks in the $k_x$-$k_z$ plane) showing how angular sight lines may be created where the corn stalks align in a repeating pattern.

As shown in the example of FIG. 6, the rows 72 and columns 74 of corn stalks (e.g., filaments 64 as illustrated in the $k_x$-$k_z$ plane) align to produce at least five angular sight lines 80 where the corn stalks align in a repeating pattern. As an example, the right-most angular sight line 80 may identify a line passing through the origin (not shown) at approximately +16.7 degrees relative to the $k_z$ axis. Corn stalks selected by changing the constituent row 72 by one and by changing the constituent column 74 by one land on a line making this +16.7 degree angle relative to the $k_z$ axis (e.g., the right-most angular sight line 80). Thus, viewed from the origin, this line of sight contains many overlapping corn stalks. In addition, if the corn stalk width is small compared to the spacing, deviating just slightly from the +16.7 degree angle would allow the observer to effectively see all the way through the corn field, indicating the presence of a gap in the canvas of the image as projected at eye box 24. Thus, at such a harmonic sight line where cornstalks separated by a small integral number of rows and columns land on a line passing through the origin, the rapid oscillation of angular corn stalk density will give rise to regions of fine bright and dark lines in the canvas of the image projected at eye box 24. These regions may form unattractive visual artifacts such as corn row artifacts (corn rows).

Corn row artifacts may be understood intuitively by analogy to an observe viewing, from ground level, through a field of corn or grove of trees planted on a regular grid. At most angles, a sufficiently dense field will appear opaque since many stalks or trunks will intersect the line of sight of an observer. However, at certain angles, the stalks or trunks will align so that gaps form, and the observer will be able to view objects on the far side of the field. This situation is detrimental to the formation of a uniform display image at eye box 24. For image light of multiple color bands, the corn rows may also introduce chromatic corn row artifacts (e.g., where some angles produce bright lines in some color bands but dark lines in other color bands, etc.). Slight non-uniform textures or "canvas noise" may also be present in the images displayed at eye box 24, caused by variations in the number of overlapping filaments. If care is not taken, this canvas noise can create an upper limit on the image fidelity achieved by the display system. In practice, some regions of a given image displayed at eye box 24 may include visible corn rows whereas other regions of the given image do not include visible corn rows. In other scenarios, corn rows may be visible throughout the image.

In order to provide images at eye box 24 with as high a fidelity and as few visible artifacts as possible, the holograms in display 14 may be configured to mitigate the formation of corn row artifacts in the images displayed at eye box 24. These artifacts may be mitigated by adjusting the spacing and/or density of the holograms in the first and/or second sets of holograms (e.g., in the first and second skew mirrors used to form cross-coupler 32 and output coupler 30 of FIG. 2, respectively). In some arrangements, corn rows formed by actual gaps in the field may be mitigated. In other arrangements, field non-uniformities not corresponding to visible gaps may be reduced or eliminated. In further arrangements, the density or number of holograms corresponding to sufficiently uniform regions of the field may be reduced in order to reduce the total number of holograms, allowing for an increase in brightness.

In other words, the spacing/density of the holograms in the first and/or second sets may be modulated by a function (sometimes referred to herein as a modulation function) to reduce corn rows and improve uniformity in the images provided to eye box 24. For example, the first set of holograms may be recorded so that the length (magnitude) of the grating vectors (the grating frequencies $K_G$ of the first set of holograms such as grating frequencies 50 of FIG. 3) for some or all of the holograms in the first set are not uniformly separated in space. Instead, rather than leaving the grating frequencies unmodulated, the first set of holograms may be recorded so that the length (magnitude) of the grating vectors (e.g., the grating frequencies $K_G$) and thus the adjacent frequency gaps $|\Delta K_G|$ for the holograms in the first set are modulated by the modulation function. Additionally or alternatively, the second set of holograms may be recorded so that the length (magnitude) of the grating vectors (the grating frequencies $K_G$ such as grating frequencies 60 of FIG. 3) for some or all of the holograms in the second set are not uniformly separated in space. Instead, rather than leaving the grating frequencies unmodulated, the second set of holograms may be recorded so that the length (magnitude) of the grating vectors (e.g., the grating frequencies $K_G$) and thus the adjacent frequency gaps $|\Delta K_G|$ for the holograms in the second set are modulated by the modulation function. If desired, the grating frequencies of the first set of holograms may be modulated by the same modulation function as the grating frequencies of the second set of holograms or may be modulated by a different modulation function than the grating frequencies of the second set of holograms. In other words, in physical space, rather than exhibiting a uniform hologram spacing (e.g., a uniform $\Delta n(\vec{r})$), the hologram spacing (e.g., the index modulations in the grating medium) may be modulated so that the index modulations and thus the holograms are not uniformly spaced (e.g., where the separation between adjacent peaks in the index modulation are determined by the modulation function across the area of the grating medium).

Figure 7:
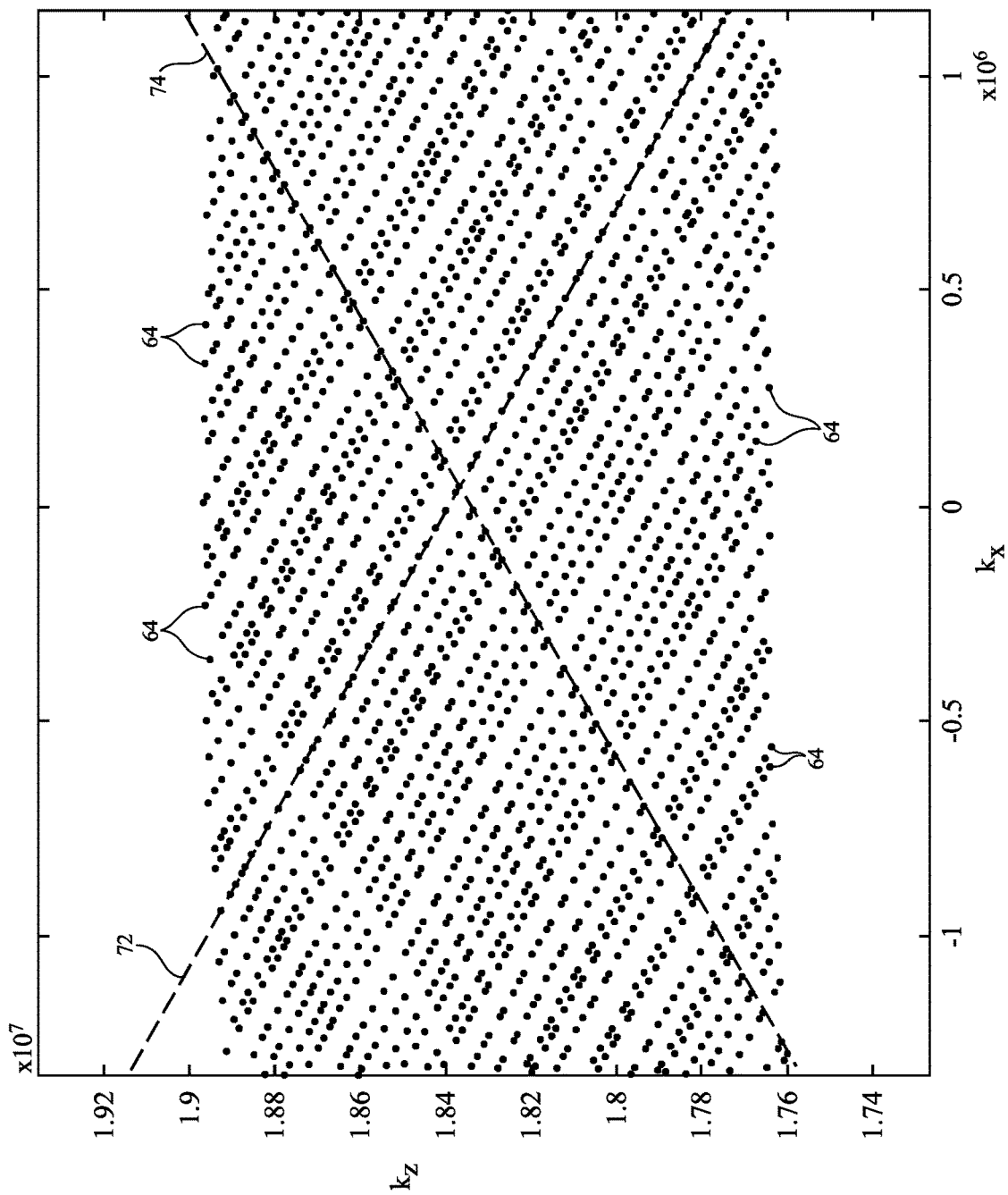
FIG. 7 is a two-dimensional cross section of three-dimensional k-space showing how first and/or second sets of holograms may have grating frequency spacings that are modulated by a pseudorandom function to produce k-space filaments that are free from angular harmonic sight lines in accordance with some embodiments.

As one example, the modulation function may be a random or pseudorandom function (e.g., the spacing/density of the holograms or the grating frequencies of the holograms may be randomly or pseudo-randomly modulated when recorded to the grating medium). An example of the effects of modulating the grating frequencies of the holograms using a pseudorandom function are shown in FIG. 7. FIG. 7 is a cross-sectional view of filaments 64 (e.g., a corn field of corn stalks in the $k_x$-$k_z$ plane) that may be produced when the holograms in the first and/or second sets have hologram spacings (grating frequencies or grating vector magnitudes) that are modulated by a pseudorandom function. As described above, these filaments may represent the second diffracted light produced by the second set of holograms upon diffraction of the first diffracted light produced by the first set of holograms.

As shown in FIG. 7, the modulation of the first set of holograms (e.g., in the first skew mirror used to form cross-coupler 32 of FIG. 2) by the pseudorandom function may cause the filaments 64 in each column 74 to also be modulated such that the filaments 64 in each column 74 are non-uniformly spaced across that column (e.g., such that the filaments 64 in each column 74 are pseudo-randomly spaced as determined by the pseudorandom function). Similarly, the modulation of the second set of holograms (e.g., in the second skew mirror used to form output coupler 30 of FIG. 2) by the pseudorandom function may cause the filaments 64 in each row 72 to also be modulated such that the filaments 64 in each row 72 are non-uniformly spaced across that row (e.g., such that the filaments 64 in each row 72 are pseudo-randomly spaced as determined by the pseudorandom function). In other words, modulating the grating frequencies of the first and second sets of holograms may cause the first and second sets of holograms to each have non-uniform adjacent frequency gaps $|\Delta K_G|$, may also cause the filaments 64 along each row 72 in the canvas to be non-uniformly spaced or distributed across that row 72, and may also cause the filaments 64 along each column 74 in the canvas to be non-uniformly spaced or distributed across that column 74. This may serve to prevent the formation of harmonic sight lines (see, e.g., angular sight lines 80 of FIG. 6) that extend throughout the entire depth of the corn field (e.g., without hitting a corn stalk or filament 64), thereby increasing uniformity and mitigating the appearance of corn rows in the images provided to eye box 24.

Figure 8:
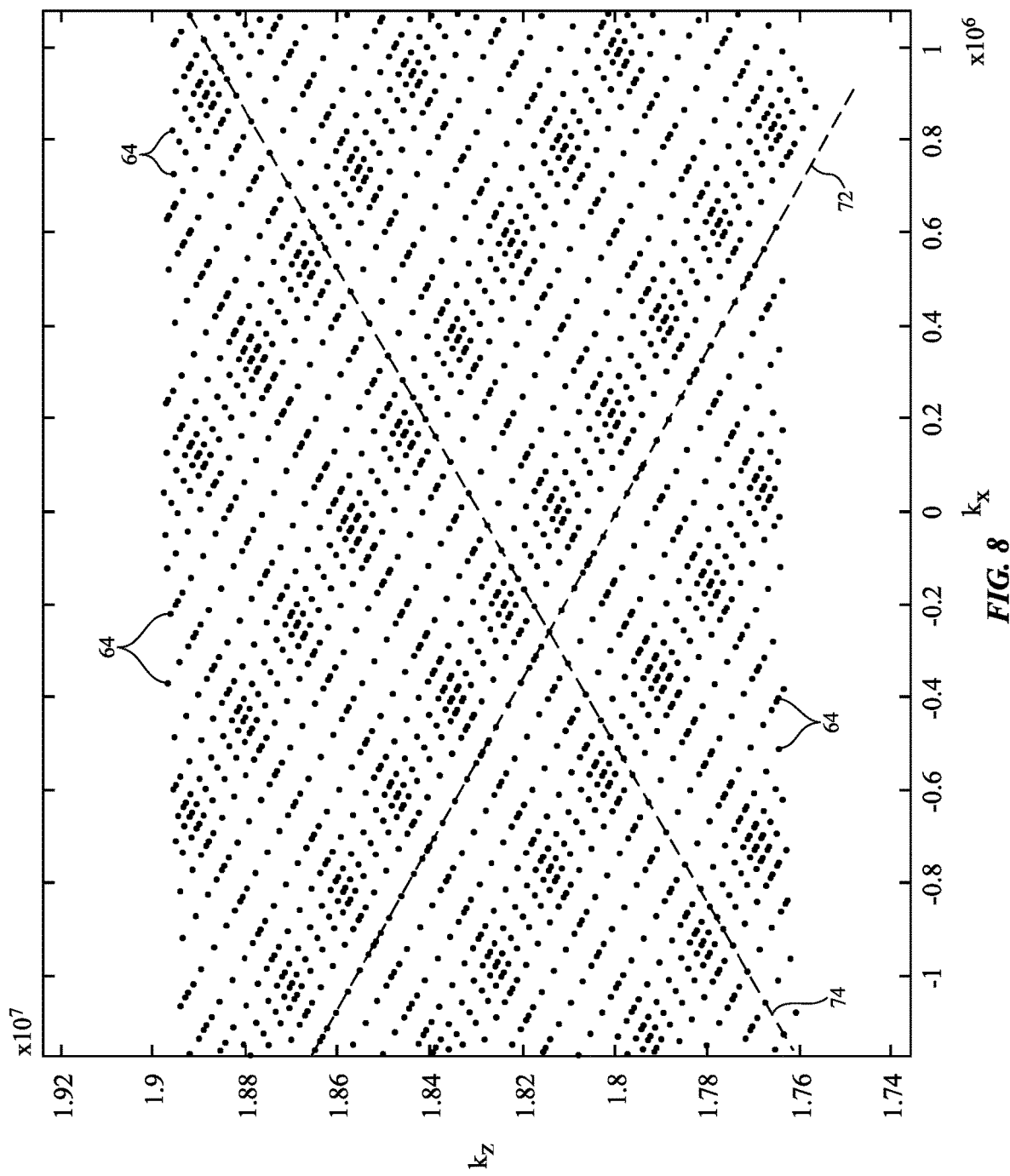
FIG. 8 is a two-dimensional cross section of three-dimensional k-space showing how first and/or second sets of holograms may have grating frequency spacings that are modulated by a cyclical or sinusoidal function to produce k-space filaments that are free from angular harmonic sight lines in accordance with some embodiments.

The example of FIG. 7 in which the modulation function is a pseudorandom function is merely illustrative. As another example, the modulation function may be a cyclic function such as a sinusoidal function (e.g., the spacing/density of the holograms or the grating frequencies of the holograms may be cyclically or sinusoidally modulated when recorded to the grating medium). An example of the effects of modulating the grating frequencies for the holograms using a cyclic or sinusoidal function are shown in FIG. 8. FIG. 8 is a cross-sectional view of filaments 64 (e.g., a corn field of corn stalks in the $k_y$-$k_z$ plane) that may be produced when the holograms in the first and/or second sets have hologram spacings (grating frequencies or grating vector magnitudes) that are modulated by a cyclic or sinusoidal function. As described above, these filaments may represent the second diffracted light produced by the second set of holograms upon diffraction of the first diffracted light produced by the first set of holograms.

As shown in FIG. 8, the modulation of the first set of holograms (e.g., in the first skew mirror used to form cross-coupler 32 of FIG. 2) by the cyclic or sinusoidal function may cause the filaments 64 in each column 74 to also be modulated such that the filaments 64 in each column 74 are non-uniformly spaced across that column (e.g., such that the filaments 64 in each column 74 are cyclically or sinusoidally spaced as determined by the cyclic or sinusoidal function). Similarly, the modulation of the second set of holograms (e.g., in the second skew mirror used to form output coupler 30 of FIG. 2) by the cyclic or sinusoidal function may cause the filaments 64 in each row 72 to also be modulated such that the filaments 64 in each row 72 are non-uniformly spaced across that row (e.g., such that the filaments 64 in each row 72 are cyclically or sinusoidally spaced as determined by the cyclic or sinusoidal function). In other words, modulating the grating frequencies of the first and second sets of holograms may cause the first and second sets of holograms to each have non-uniform adjacent frequency gaps $|\Delta K_G|$, may also cause the filaments 64 along each row 72 in the canvas to be non-uniformly spaced or distributed across that row 72, and may also cause the filaments 64 along each column 74 in the canvas to be non-uniformly spaced or distributed across that column 74. This may serve to prevent the formation of harmonic sight lines (see, e.g., angular sight lines 80 of FIG. 6) that extend throughout the entire depth of the corn field (e.g., without hitting a corn stalk or filament 64), thereby increasing uniformity and mitigating the appearance of corn rows in the images provided to eye box 24.

The examples of FIGS. 7 and 8 where the modulation function for the grating frequencies in the first and second sets of holograms is a pseudorandom, cyclic, or sinusoidal function are merely illustrative. In general, the modulation function may be any desired function (e.g., a step function, a polynomial function, a curve, a linear function, a piecewise function, a combination of different functions, etc.) that configures the first and second sets of holograms to mitigate the formation of visual artifacts associated with cascaded diffractions such as corn rows, or that configures the first and second sets of holograms to increase or maximize uniformity in the images provided to eye box 24.

If desired, the grating frequencies of the first and/or second sets of holograms may be modulated using the modulation function only within some regions (portions) of the field of view (e.g., only within some regions or portions of the lateral area of the grating medium). For example, the grating frequencies of the first and/or second sets of holograms may be modulated using the modulation function only within the portions of the field of view that are likely to include corn rows or other non-uniformities (whereas the first and second sets of holograms may have unmodulated or uniformly spaced grating frequencies in other portions of the field of view). If desired, the modulation function itself may be selected such that it is a modulation function that provides non-uniform hologram spacings within some portions of the field of view but that provides uniform hologram spacings within other portions of the field of view. Additionally or alternatively, the first and/or second sets of holograms may include more or fewer holograms within the portions of the field of view that are likely to include corn rows or other non-uniformities than are included in other portions of the field of view (e.g., the density of holograms in the first and/or second set may be varied across the field of view). This variation in the number of holograms (e.g., hologram density) across the lateral area of the grating medium and thus the field of view may also help to mitigate formation of corn rows or other non-uniformities at the eye box.

If desired, corn rows or other non-uniformities may be mitigated by including one or more skew mirrors in optical path 31 (FIG. 2) of sufficiently high density so that there are no significant gaps or non-uniformities in their spatio-spectral response. Such a high-density skew mirror may approach the performance of an ideal continuous skew mirror. Fabrication of high-density skew mirrors may involve active feedback for phase control of constituent holograms. In the case of a two-skew mirror display system, only one of the skew mirrors need be provided with high-density to eliminate corn rows and related non-uniformities, provided broad band illumination is used.

If desired, corn rows or other non-uniformities may be mitigated by increasing the bandwidth of the illumination provided by display module 14A (FIG. 2). In the corn field analogy, increasing the illumination bandwidth corresponds to making the corn field deeper, which may reduce the prevalence of gaps. Conversely, narrow band illumination may increase non-uniformities. Very narrow-band illumination (e.g., laser illumination) may produce significant non-uniformities and gaps even in a single discrete skew mirror system.

The examples described above have concentrated on the case of two discrete skew mirrors in series (e.g., for cross-coupler 32 and output coupler 30 of FIG. 2). In other cases, there may be more or fewer skew mirrors optically coupled in series (e.g., along optical path 31 of FIG. 2), or the angle between the reflective axes of the two cascaded skew mirrors may be small, resulting in coarse uniformity variations rather than fine corn rows. In such cases, the techniques described herein may still be employed to improve uniformity and/or throughput to eye box 24.

Figure 9:
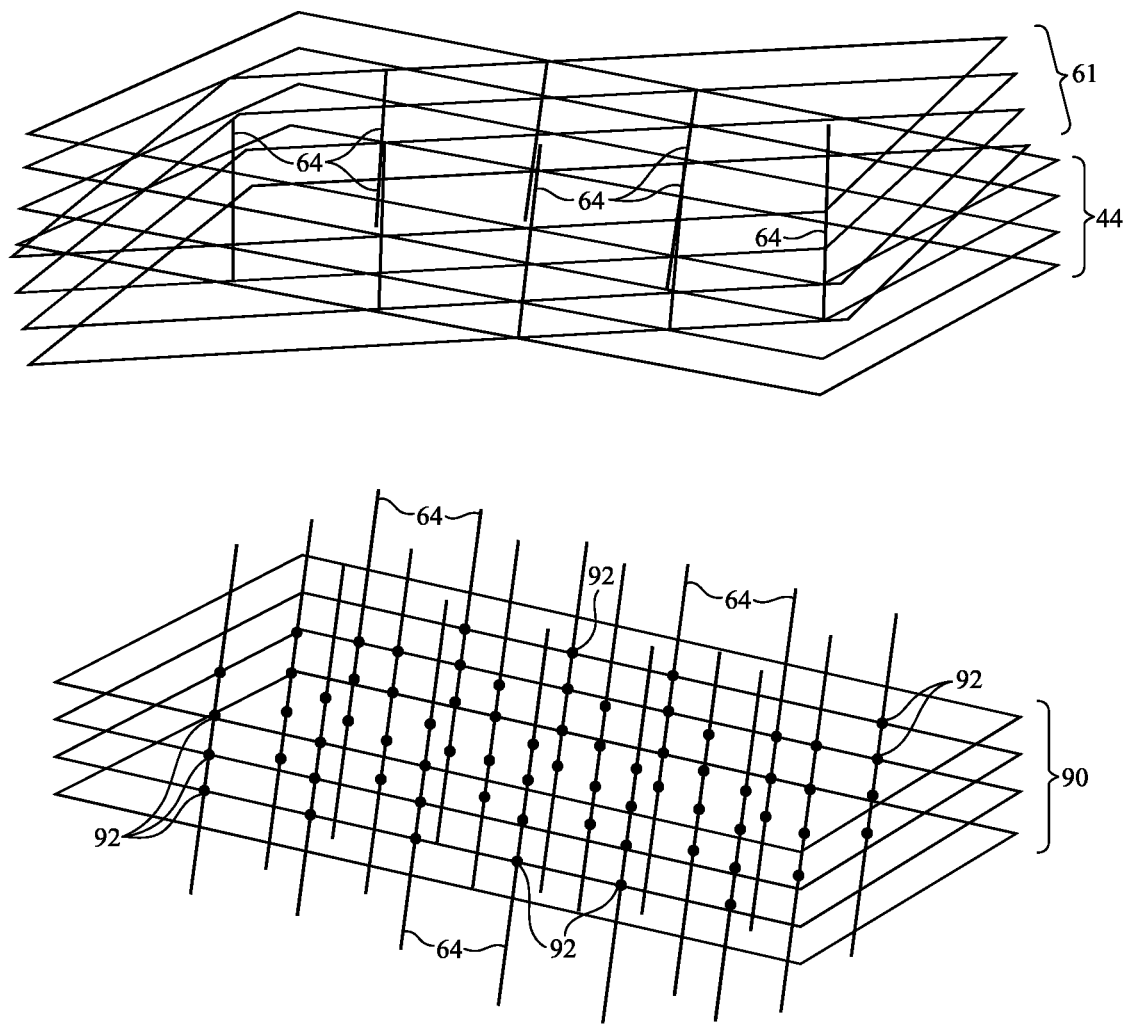
FIG. 9 is a diagram of three-dimensional k-space showing how three sets of holograms interposed in a sequence on an optical path may produce diffracted light within corresponding k-space point distributions in accordance with some embodiments.

Consider an example in which three cascaded discrete skew mirrors are interposed on optical path 31 of FIG. 2. In this example, a first skew mirror may diffract image light 22 to produce first diffracted light, a second skew mirror may diffract the first diffracted light as second diffracted light, and a third skew mirror may diffract the second diffracted light as third diffracted light. The first skew mirror may include the first set of holograms (e.g., as described above), the second skew mirror may include the second set of holograms (e.g., as described above), and the third skew mirror may include a third set of holograms. FIG. 9 conceptually illustrates the operations of the first, second, and third skew mirrors in this example, in three-dimensional k-space.

As shown in FIG. 9, the first set of holograms may diffract incident image light 22 to produce the first diffracted light within louvers 44 in three-dimensional k-space. The second set of holograms may diffract the first diffracted light to produce the second diffracted light within filaments 64 in three-dimensional k-space (e.g., where filaments 64 are line segments corresponding to where louvers 44 intersect with the louvers 61 associated with the second set of holograms). The third set of holograms may diffract the second diffracted light to produce third diffracted light within point-like distributions such as points 92 in three-dimensional k-space. The third set of holograms may have an associated louver 90 where the third set of holograms would diffract light incident within the entirety of a given region in k-space. However, as the second diffracted light is only incident upon the third set of holograms within filaments 64, the third diffracted light is only produced within points 92, where louvers 90 intersect with filaments 64 in k-space. The intersection of a line (e.g., filaments 64) with a plane at an oblique angle (e.g., a given one of louvers 90) is a point (e.g., points 92). The size of each point 92 is determined by the hologram thickness(es) in conjunction with the geometry of the first, second, and third skew mirrors. For a display system that supports an image resolution approaching that of the human eye, each point 92 would be very small, subtending an angle on the order of a single resolvable spot in the image, for example. The third diffracted light may, for example, be provided to eye box 24 of FIG. 2. In this example, the image "canvas" provided to eye box 24 will be composed of point-like spots 92 instead of line segment-like filaments 64. Corn rows will manifest as image regions where gaps form between the grid-like pattern of spots rather than the fine lines of a two-skew mirror system. This example is merely illustrative and, if desired, more than three cascaded skew mirrors may be interposed on optical path 31 of FIG. 2.

In some arrangements, skew mirror-like components may exhibit spatio-spectral gaps similar to those of discrete skew mirrors, and the mitigation techniques described herein may be provided for such skew mirror-like components. For instance, a spatially-varying skew mirror is a skew mirror where the reflective axis varies as a function of spatial (e.g., X,Y) coordinates. A spatially-varying skew mirror may be discrete or continuous. A discrete spatially-varying skew mirror may be used in series with one or more other discrete spatially-varying skew mirrors or non-spatially-varying discrete skew mirrors. Other skew mirror-like components that may be optimized as described herein may include skew mirrors with a cylindrical field of view, skew mirrors with a foveated field of view, or discrete holograms spatially-multiplexed in a recording medium.

Figure 10:
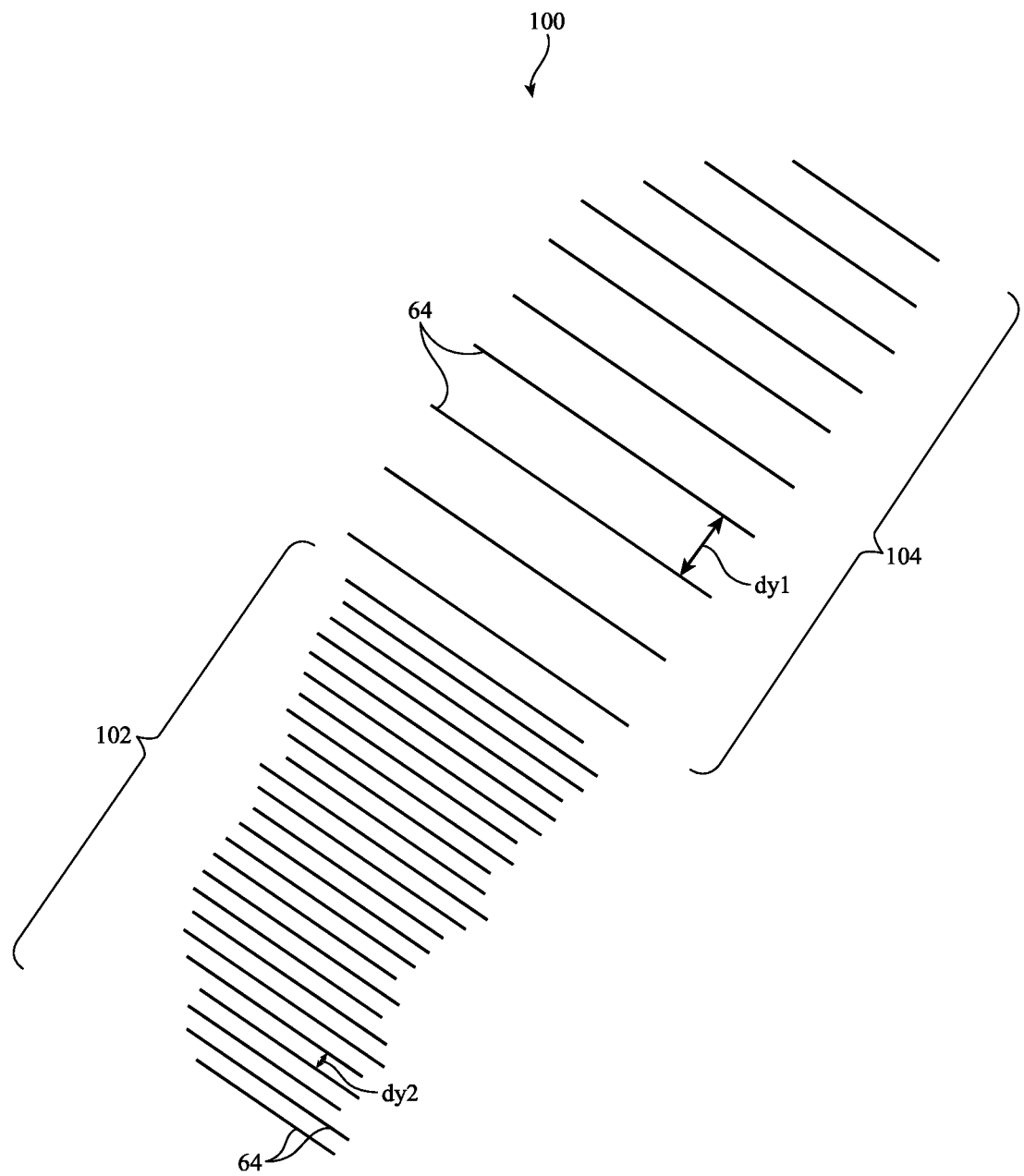
FIG. 10 is a diagram showing how different regions of an illustrative image canvas may have different k-space filament spacings in accordance with some embodiments.

FIG. 10 is a diagram showing how different regions of the image canvas may be provided with different filament spacings, which may lead to undesirable non-uniformities in the image provided to the eye box. As shown in FIG. 10, plot 100 plots the filaments 64 produced by the diffraction of the first diffracted light by the second set of holograms. Some portions of the field of view such as portion 104 may exhibit a relatively wide spacing dy1 between adjacent filaments 64. Other portions of the field of view such as portion 102 may exhibit a relatively narrow spacing dy2 between adjacent filaments 64. The wide spacing dy1 in portion 104 may cause the filaments 64 within portion 104 to produce non-uniformities and corn rows in the image provided to the eye box. However, narrow spacing dy2 in portion 104 may be sufficiently low such that the filaments 64 within portion 102 do not produce non-uniformities or corn rows in the image provided to the eye box. The modulation or density of the grating frequencies in the first skew mirror (e.g., cross-coupler 32 of FIG. 2) may be adjusted and/or the modulation or density of the grating frequencies in the second skew mirror (e.g., output coupler 30 of FIG. 2), the bandwidth, and/or the grating vector orientation of the first and/or second skew mirror may be adjusted to effectively reduce width dy1 in region 104 to minimize non-uniformities and corn rows produced by the filaments 64 in region 104. Modulating the grating frequencies may involve changes to the adjacent frequency gaps $|\Delta K_G|$ between adjacent grating frequencies in the first and/or second sets of holograms (e.g., in units of inverse microns), which in turn effectuate a change in spacing dy1 between the filaments 64 in portion 104 (e.g., in angle space). In general, this may be done to optimize the spacing between filaments 64 within any desired number of discrete portions of the field of view. This may serve to minimize corn rows and non-uniformities across the entire field of view even when only some portions of the field of view are subject to corn rows or non-uniformities or when different adjustments to grating frequency spacing is required in different regions of the field of view to mitigate corn rows.

Figure 11:
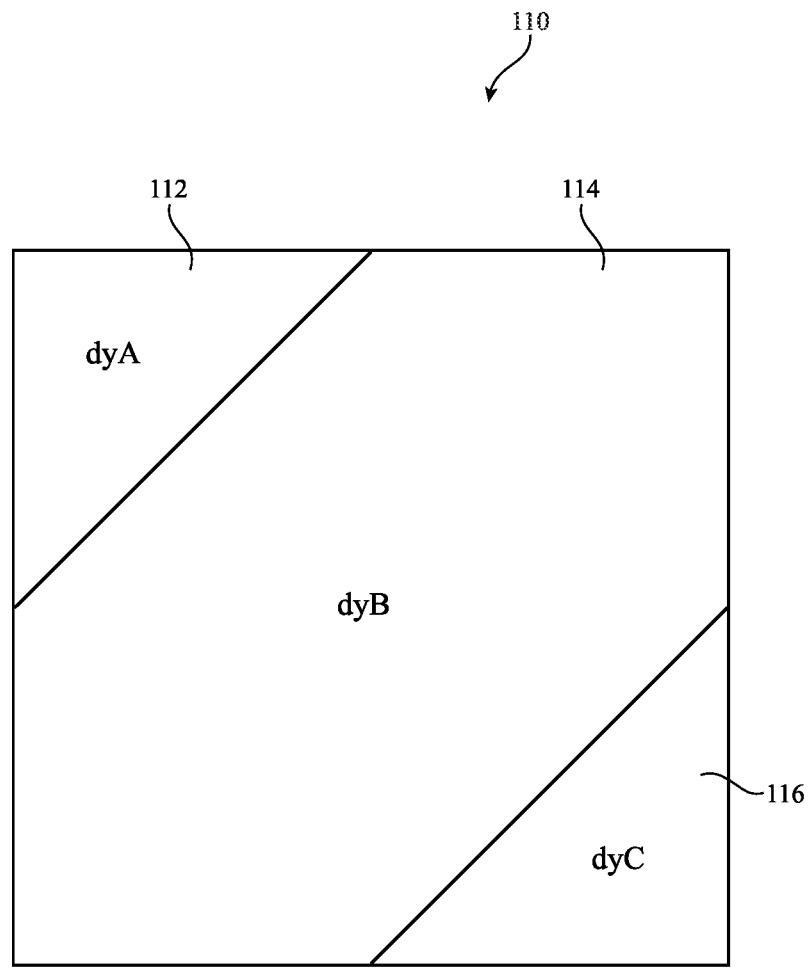
FIG. 11 is an angle space diagram of an illustrative field of view of images provided to an eye box showing how different k-space filament spacings may be used across the field of view to mitigate non-uniformities in images provided to the eye box in accordance with some embodiments.

FIG. 11 is a diagram of the field of view of the images provided to eye box 24 (e.g., in angle space), showing how different filament spacings may be used across the field of view. As shown in FIG. 11, a first portion 112 of field of view 110 may be provided with a first spacing dyA between adjacent filaments 64 (FIG. 10). A second portion 114 of field of view 110 may be provided with a second spacing dyB between adjacent filaments 64. A third portion 116 of field of view 110 may be provided with a third spacing dyC between adjacent filaments 64. The first, second, and third spacings may be different or two or more of the spacings may be the same.

First spacing dyA may, for example, be produced by recording the holograms of the first and/or second sets of holograms within region 112 of field of view 110 with grating frequencies (e.g., adjacent frequency gaps $|\Delta K_G|$) that are modulated by a first modulation function (or that are provided with a first grating density), which configures the first and second sets of holograms to produce second diffracted light having first spacing dyA in angle space within region 112 of field of view 110. Similarly, second spacing dyB may be produced by recording the holograms of the first and/or second sets of holograms within region 114 of field of view 110 with grating frequencies (e.g., adjacent frequency gaps $|\Delta K_G|$) that are modulated by a second modulation function (or that are provided with a second grating density), which configures the first and second sets of holograms to produce second diffracted light having second spacing dyB in angle space within region 114 of field of view 110. Similarly, third spacing dyC may be produced by recording the holograms of the first and/or second sets of holograms within region 116 of field of view 110 with grating frequencies (e.g., adjacent frequency gaps $|\Delta K_G|$) that are modulated by a third modulation function (or that are provided with a third grating density), which configures the first and second sets of holograms to produce second diffracted light having third spacing dyC in angle space within region 116 of field of view 110. Different modulation functions or the same modulation function may be used for the first and second sets of holograms in each of the regions if desired (e.g., the holograms in the cross-coupler within region 112 may be modulated by a first modulation function whereas the holograms in the output-coupler within region 112 may be modulated by a different modulation function, etc.).

In this way, different regions (portions) of the field of view may be provided with different adjacent frequency gaps $|\Delta K_G|$ and thus different filament spacings as necessary to mitigate corn rows and non-uniformities across an entirety of field of view 110 (e.g., even in scenarios where different regions of the field of view are subject to different levels of non-uniformity). The example of FIG. 11 is merely illustrative. In general, field of view 110 may be divided into any desired number of regions of any desired shape having any desired filament spacings. For example, field of view 110 may be divided into two regions, four regions, five regions, or more than five regions having different filament spacings. In general, greater numbers of regions may make stitching between the regions less noticeable to the user at eye box 24.

Figure 12:
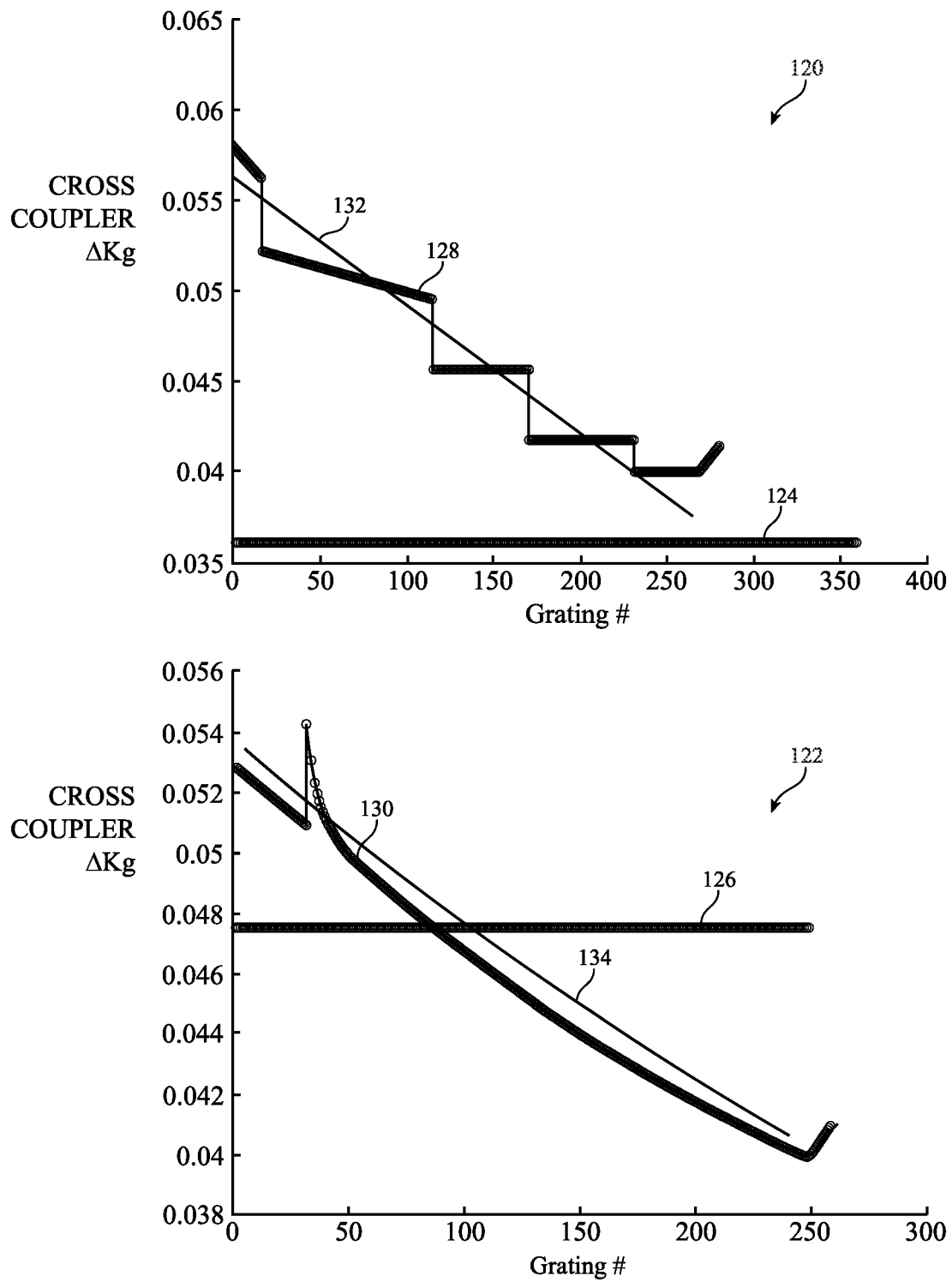
FIG. 12 includes illustrative plots showing how the grating frequency spacings in first and second sets of holograms may be modulated by different modulation functions to mitigate non-uniformities in images provided to an eye box in accordance with some embodiments.

FIG. 12 includes plots showing how the grating frequencies in the first and second sets of holograms (e.g., in the first skew mirror used to form cross-coupler 32 and in the second skew mirror used to form output coupler 30) may be modulated by different modulation functions (e.g., within a given region of the field of view such as region 114 of FIG. 11 or elsewhere).

Plot 120 of FIG. 12 plots the modulation of the first set of holograms (e.g., in cross-coupler 32). Plot 112 of FIG. 12 plots the modulation of the second set of holograms (e.g., in output coupler 30). The horizontal axis of plot 120 plots the grating number in the first set of holograms (e.g., where a grating number of "0" corresponds to a first hologram in the first set, where a grating number of "1" corresponds to a second hologram in the first set, where a grating number of "2" corresponds to a third hologram in the first set, etc.). Similarly, the horizontal axis of plot 122 plots the grating number in the second set of holograms. Each hologram (e.g., each grating number) has a respective grating vector (e.g., oriented along the same axis), the magnitude of which defines the grating frequency $K_G$ for that hologram. Each hologram in the first set has a grating frequency $K_G$ that is separated from the grating frequency $K_G$ of the next hologram in the first set by a corresponding adjacent frequency gap $\Delta K_G$. Similarly, each hologram in the second set has a grating frequency $K_G$ that is separated from the grating frequency $K_G$ of the next hologram in the second set by a corresponding adjacent frequency gap $\Delta K_G$. The vertical axis of plot 120 plots the adjacent frequency gap $\Delta K_G$ for each hologram in the first set. The vertical axis of plot 122 plots the adjacent frequency gap $\Delta K_G$ for each hologram in the second set.

Curve 124 in plot 120 illustrates the adjacent frequency gaps $\Delta K_G$ of the first set of holograms in a scenario where there is a uniform spacing between each of the grating frequencies in the first set of holograms (e.g., where the grating frequencies in the first set of holograms are unmodulated). Curve 128 in plot 120 shows how the grating frequencies and thus the adjacent frequency gaps $\Delta K_G$ of the first set of holograms may be modulated by a modulation function such as a decreasing step function.

Curve 126 in plot 122 illustrates the adjacent frequency gaps $\Delta K_G$ of the second set of holograms in a scenario where there is a uniform spacing between each of the grating frequencies in the second set of holograms (e.g., where the grating frequencies in the second set of holograms are unmodulated). Curve 130 in plot 122 shows how the grating frequencies and thus the adjacent frequency gaps $\Delta K_G$ of the second set of holograms may be modulated by a modulation function such as a decreasing nearly-linear function. These examples are merely illustrative and, in general, any modulation functions may be used. The step function associated with curve 128 may be used to modulate the second set of holograms and/or the modulation function associated with curve 130 may be used to modulate the first set of holograms if desired. The same function may be used to modulate both the first and second sets of holograms if desired.

In another suitable arrangement, if desired, a linear function having a non-zero slope and a non-zero y-intercept such as decreasing linear function may be used to modulate the grating frequencies (and thus the adjacent frequency gaps $\Delta K_G$) of the first set of holograms, as shown by curve 132. Curve 132 may have other non-zero slopes or y-intercepts if desired. Additionally or alternatively, a linear function having a non-zero slope and a non-zero y-intercept such as a decreasing linear function may be used to modulate the grating frequencies (and thus the adjacent frequency gaps $\Delta K_G$) of the second set of holograms, as shown by curve 134. Curve 134 may have other non-zero slopes or y-intercepts if desired.

These examples are merely illustrative. Curves 128, 132, 130, and 134 may have other shapes. If desired, the first set of holograms may have uniform adjacent frequency gaps (grating frequency spacings) across the first set (e.g., as shown by curve 124) whereas the second set of holograms has non-uniform adjacent frequency gaps (grating frequency spacings) across the second set (e.g., as shown by curves 130, 134, 128, etc.). Similarly, if desired, the second set of holograms may have uniform adjacent frequency gaps across the second set (e.g., as shown by curve 126) whereas the first set of holograms has non-uniform adjacent frequency gaps across the first set (e.g., as shown by curves 132, 128, etc.). Modulating the grating frequencies and thus the adjacent frequency gaps $\Delta K_G$ in this way may cause the cross coupler and the output coupler to produce second diffracted light that is free from harmonic sight lines (e.g., as shown by filaments 64 in FIGS. 7 and 8, the filaments 64 within region 102 of FIG. 10, and spacings dyA, dyB, and dyC of FIG. 11), thereby allowing the images provided to eye box 24 to be free from corn rows or other non-uniformities.

The foregoing is merely illustrative and various modifications can be made to the described embodiments. The foregoing embodiments may be implemented individually or in any combination.

What is claimed is:

1. A display system comprising:
  a display module configured to produce image light;
  a first set of volume holograms configured to diffract the image light to produce first diffracted light, wherein each volume hologram in the first set of volume holograms has a respective grating vector oriented along a common axis, wherein each of the grating vectors has a respective magnitude, and wherein the magnitudes of the grating vectors are non-uniformly spaced across the first set of volume holograms; and
  a second set of volume holograms configured to diffract the image light to produce second diffracted light that is directed towards an eye box.

2. The display system of claim 1, wherein each volume hologram in the second set of volume holograms has a respective additional grating vector oriented along an additional common axis that is different from the common axis.

3. The display system of claim 2, wherein each of the additional grating vectors has a respective additional magnitude and wherein the additional magnitudes of the additional grating vectors are uniformly spaced across the second set of volume holograms.

4. The display system of claim 2, wherein each of the additional grating vectors has a respective additional magnitude and wherein the additional magnitudes of the additional grating vectors are non-uniformly spaced across the second set of volume holograms.

5. The display system of claim 4, wherein the magnitudes of the grating vectors are modulated by a first modulation function and wherein the additional magnitudes of the additional grating vectors are modulated by a second modulation function that is different from the first modulation function.

6. The display system of claim 1, further comprising:
a waveguide;
a cross-coupler on the waveguide, wherein the cross-coupler comprises the first set of volume holograms; and
an output coupler on the waveguide, wherein the output coupler comprises the second set of volume holograms.

7. The display system of claim 5, wherein the image light comprises light in first, second, and third color bands, wherein the first diffracted light includes light in the first, second, and third color bands, and wherein the second diffracted light includes light in the first, second, and third color bands.

8. The display system of claim 6, wherein the first color band comprises a red color band, the second color band comprises a green color band, and the third color band comprises a blue color band.

9. The display system of claim 1, wherein the magnitudes of the grating vectors are modulated by a modulation function.

10. The display system of claim 9, wherein the modulation function comprises a function selected from the group consisting of: a pseudorandom function, a cyclic function, a sinusoidal function, a linear function, a polynomial function, a curve, and a step function.

11. The display system of claim 1, further comprising:
a waveguide; and
a holographic recording medium on the waveguide, wherein the first and second sets of volume holograms are recorded on the holographic recording medium, the common axis being oriented at a non-parallel and non-perpendicular angle with respect to a lateral surface of the holographic recording medium.

12. The display system of claim 11, wherein the first set of volume holograms have a first density in a first region of the holographic recording medium and a second density that is different from the first density in a second region of the holographic recording medium.

13. A display system comprising:
a display module configured to produce image light;
a first set of volume holograms configured to diffract the image light to produce first diffracted light; and
a second set of volume holograms configured to diffract the image light to produce second diffracted light that is directed towards an eye box, wherein each volume hologram in the second set of volume holograms has a respective grating vector oriented along a common axis, wherein each of the grating vectors has a respective magnitude, and wherein the magnitudes of the grating vectors are non-uniformly spaced across the second set of volume holograms.

14. The display system of claim 13, wherein each volume hologram in the first set of volume holograms has a respective additional grating vector oriented along an additional common axis that is different from the common axis.

15. The display system of claim 14, wherein each of the additional grating vectors has a respective additional magnitude and wherein the additional magnitudes of the additional grating vectors are uniformly spaced across the first set of volume holograms.

16. The display system of claim 13, further comprising:
a waveguide;
a cross-coupler on the waveguide, wherein the cross-coupler comprises the first set of volume holograms; and
an output coupler on the waveguide, wherein the output coupler comprises the second set of volume holograms.

17. The display system of claim 16, wherein the image light comprises light in first, second, and third color bands, wherein the first diffracted light includes light in the first, second, and third color bands, and wherein the second diffracted light includes light in the first, second, and third color bands.

18. The display system of claim 13, wherein the magnitudes of the grating vectors are modulated by a modulation function.

19. The display system of claim 18, wherein the modulation function comprises a function selected from the group consisting of: a pseudorandom function, a cyclic function, a sinusoidal function, a linear function, a polynomial function, a curve, and a step function.

20. The display system of claim 13, further comprising:
a waveguide; and
a holographic recording medium on the waveguide, wherein the first and second sets of volume holograms are recorded on the holographic recording medium, the common axis being oriented at a non-parallel and non-perpendicular angle with respect to a lateral surface of the holographic recording medium.

21. The display system of claim 20, wherein the second set of holograms have a first density in a first region of the holographic recording medium and a second density that is different from the first density in a second region of the holographic recording medium.

22. A display system configured to mitigate non-uniformities in an image provided to an eye box, the display system comprising:
a first set of volume holograms configured to diffract image light to produce first diffracted light, wherein the image light conveys the image; and
a second set of volume holograms configured to diffract the first diffracted light to produce second diffracted light that is directed towards the eye box, wherein a given one of the first and second sets of volume holograms comprises:
a first region in which the given one of the first and second sets of volume holograms has first grating frequencies that are separated by first adjacent frequency gaps, and
a second region in which the given one of the first and second sets of volume holograms has second grating frequencies that are separated by second adjacent frequency gaps that are different from the first adjacent frequency gaps.

23. The display system of claim 22, wherein the first adjacent frequency gaps are non-uniformly distributed across the given one of the first and second sets of volume holograms within the first region.

24. The display system of claim 23, wherein the second adjacent frequency gaps are non-uniformly distributed across the given one of the first and second sets of volume holograms within the second region.

25. The display system of claim 23, wherein the second adjacent frequency gaps are uniformly distributed across the given one of the first and second sets of volume holograms within the second region.

26. The display system of claim 22, wherein the first grating frequencies are modulated by a first modulation function and wherein the second grating frequencies are modulated by a second modulation function that is different than the first modulation function.

27. A display system comprising:
a first set of volume holograms configured to diffract image light to produce first diffracted light, wherein each volume hologram in the first set of volume holograms has a respective first grating vector oriented along a first common axis, wherein each of the first grating vectors has a respective first magnitude, and wherein the first magnitudes of the first grating vectors are modulated, across the first set of volume holograms, by a first linear function having a first non-zero slope; and
a second set of volume holograms configured to diffract the first diffracted light to produce second diffracted light that is directed towards an eye box, wherein each volume hologram in the second set of volume holograms has a respective second grating vector oriented along a second common axis, wherein each of the second grating vectors has a respective second magnitude, and wherein the second magnitudes of the second grating vectors are modulated, across the second set of volume holograms, by a second linear function having a second non-zero slope.

28. The display of claim 27, further comprising:
a waveguide;
a cross-coupler on the waveguide, wherein the cross-coupler comprises the first set of volume holograms; and
an output coupler on the waveguide, wherein the output coupler comprises the second set of volume holograms.

* * * * *